US012651114B2

(12) United States Patent
Malviya et al.

(10) Patent No.: US 12,651,114 B2
(45) Date of Patent: Jun. 9, 2026

(54) DYNAMIC USER INTERFACE RELATED TO AUTOMATED ELECTRONIC DOCUMENT CREATION THROUGH MACHINE LEARNING

(71) Applicant: INTUIT INC., Mountain View, CA (US)

(72) Inventors: Saket Malviya, Milpitas, CA (US); Patteaswaran Karivaradasamy, Frisco, TX (US); Shekhar Baggavalli Raju, New York, NY (US); Arpit Srivastava, Metuchen, NJ (US); Enkhbold Ochirbat, New York City, NY (US); Sylvester Kankam, Toronto (CA)

(73) Assignee: INTUIT INC., Mountain View, CA (US)

( * ) Notice: Subject to any disclaimer, the term of this patent is extended or adjusted under 35 U.S.C. 154(b) by 231 days.

(21) Appl. No.: 18/590,144

(22) Filed: Feb. 28, 2024

(65) Prior Publication Data

US 2025/0272480 A1 Aug. 28, 2025

(51) Int. Cl.
*G06F 40/174* (2020.01)
*G06F 40/106* (2020.01)

(52) U.S. Cl.
CPC .......... *G06F 40/174* (2020.01); *G06F 40/106* (2020.01); *G06F 2203/04803* (2013.01)

(58) Field of Classification Search
None
See application file for complete search history.

(56) References Cited

U.S. PATENT DOCUMENTS

| | | | |
|---|---|---|---|
| 10,621,678 B1 * | 4/2020 | Ramotar | ............... H04L 63/102 |
| 10,650,086 B1 * | 5/2020 | Knudson | ............... G06F 40/134 |
| 2009/0092318 A1 * | 4/2009 | Berard | ................ G06V 10/987 |
| | | | 382/176 |

(Continued)

OTHER PUBLICATIONS

Sahu, S. (Apr. 10, 2020). Invoice processing using robotic process automation. International Journal of Scientific Research in Computer Science, Engineering and Information Technology, 6(2), 223. Retrieved Nov. 4, 2025 from https://www.academia.edu/download/81813418/CSEIT2062106.pdf. (Year: 2020).*

*Primary Examiner* — Linda Huynh
(74) *Attorney, Agent, or Firm* — Patterson + Sheridan, LLP

(57) ABSTRACT

Aspects of the present disclosure relate to dynamic interaction with an automatically created electronic document. Embodiments include displaying, in a user interface associated with a computing application, a representation of an electronic document that was automatically created based on a source electronic document. Embodiments include displaying, in the user interface, a representation of the source electronic document in a same screen as the representation of the electronic document. Embodiments include detecting, via the user interface, a user action with respect to an item in the electronic document. Embodiments include displaying, in the user interface, based on the user action, in the same screen as the representation of the electronic document and the representation of the source electronic document, a visual indication that the item was automatically determined based on a particular portion of the source electronic document.

17 Claims, 11 Drawing Sheets

(56)  References Cited

U.S. PATENT DOCUMENTS

| | | | |
|---|---|---|---|
| 2013/0097490 A1* | 4/2013 | Kotler | G06F 40/10 |
| | | | 715/255 |
| 2014/0348396 A1* | 11/2014 | Laaser | G06V 30/40 |
| | | | 382/113 |
| 2015/0278169 A1* | 10/2015 | Vanderport | G06F 3/04847 |
| | | | 715/208 |
| 2016/0239565 A1* | 8/2016 | Falkner | G06F 16/93 |
| 2017/0255974 A1* | 9/2017 | Kulkarni | G06Q 30/04 |
| 2020/0142862 A1* | 5/2020 | Lopez Ruiz | G06F 16/1865 |
| 2023/0229711 A1* | 7/2023 | Schafer | G06F 16/906 |
| | | | 707/740 |

* cited by examiner

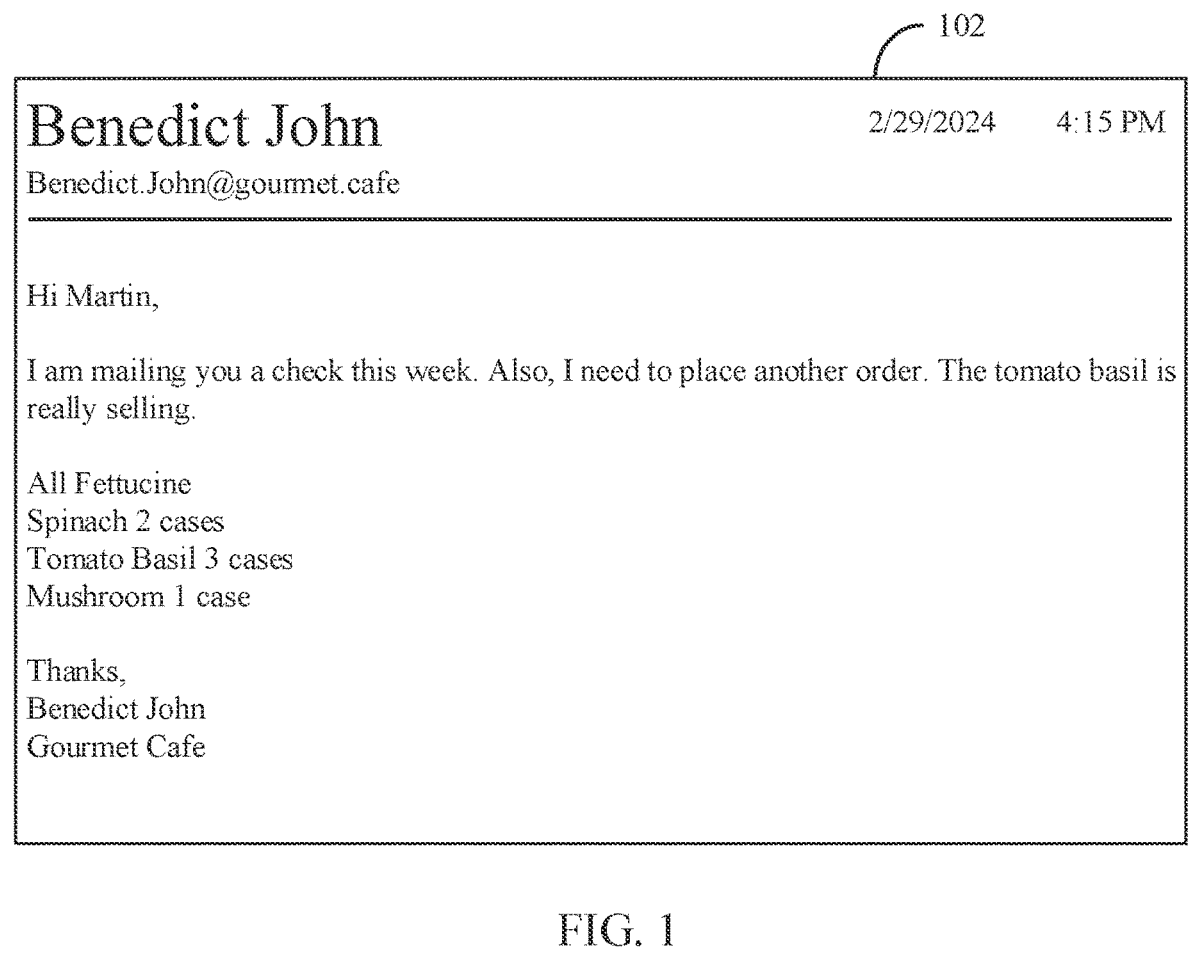

102

Benedict John                    2/29/2024        4:15 PM

Benedict.John@gourmet.cafe

---

Hi Martin,

I am mailing you a check this week. Also, I need to place another order. The tomato basil is really selling.

All Fettucine
Spinach 2 cases
Tomato Basil 3 cases
Mushroom 1 case

Thanks,
Benedict John
Gourmet Cafe

FIG. 1

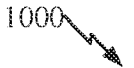

1000

1002

DISPLAY, IN A USER INTERFACE ASSOCIATED WITH A COMPUTING APPLICATION, A REPRESENTATION OF AN ELECTRONIC DOCUMENT THAT WAS AUTOMATICALLY CREATED BASED ON A SOURCE ELECTRONIC DOCUMENT

1004

DISPLAY, IN THE USER INTERFACE, A REPRESENTATION OF THE SOURCE ELECTRONIC DOCUMENT IN A SAME SCREEN AS THE REPRESENTATION OF THE ELECTRONIC DOCUMENT

1006

DETECT, VIA THE USER INTERFACE, A USER ACTION WITH RESPECT TO AN ITEM IN THE ELECTRONIC DOCUMENT

1008

DISPLAY, IN THE USER INTERFACE, BASED ON THE USER ACTION, IN THE SAME SCREEN AS THE REPRESENTATION OF THE ELECTRONIC DOCUMENT AND THE REPRESENTATION OF THE SOURCE ELECTRONIC DOCUMENT, A VISUAL INDICATION THAT THE ITEM WAS AUTOMATICALLY DETERMINED BASED ON A PARTICULAR PORTION OF THE SOURCE ELECTRONIC DOCUMENT

FIG. 10

DYNAMIC USER INTERFACE RELATED TO AUTOMATED ELECTRONIC DOCUMENT CREATION THROUGH MACHINE LEARNING

INTRODUCTION

Aspects of the present disclosure relate to user interfaces associated with automatic creation of electronic documents such as invoices in software applications based on source electronic documents. In particular, techniques described herein involve dynamic user interfaces for displaying, reviewing, and providing feedback with respect to results of utilizing machine learning techniques to dynamically extract data items from source electronic documents, utilizing dynamic matching algorithms to match extracted data items to elements in data stores, and automatically creating electronic documents based on the extracting and the matching.

BACKGROUND

Every year millions of people, businesses, and organizations around the world utilize software applications to assist with countless aspects of life. For example, many businesses rely on software applications for creating electronic documents such as invoices for billing customers for products and services. Some software applications provide user interfaces that are configured to allow users to create invoices, such as by entering information such as a customer name, identifying information of an item or service, a quantity, a rate (e.g., cost per unit of an item or service), and the like via user interface controls.

Utilizing software applications to create invoices and other types of electronic documents with conventional techniques may be a time-consuming, repetitive, and inefficient process. In some cases, creation of electronic documents using existing software applications results in inefficient use of time and computing resources, creating bottlenecks that prevent other tasks from being performed on a computing device. As such, there is a need in the art for improved techniques of electronic document creation.

BRIEF SUMMARY

Certain embodiments provide a method for dynamic interaction with an automatically created electronic document. The method generally includes: displaying, in a user interface associated with a computing application, a representation of an electronic document that was automatically created based on a source electronic document; displaying, in the user interface, a representation of the source electronic document in a same screen as the representation of the electronic document; detecting, via the user interface, a user action with respect to an item in the electronic document; displaying, in the user interface, based on the user action, in the same screen as the representation of the electronic document and the representation of the source electronic document, a visual indication that the item was automatically determined based on a particular portion of the source electronic document.

Other embodiments comprise systems configured to perform the method set forth above as well as non-transitory computer-readable storage mediums comprising instructions for performing the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 1 depicts an example of an electronic source document related to automated electronic document creation.

FIG. 10 depicts example operations related to dynamic interaction with an automatically created electronic document.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 2:
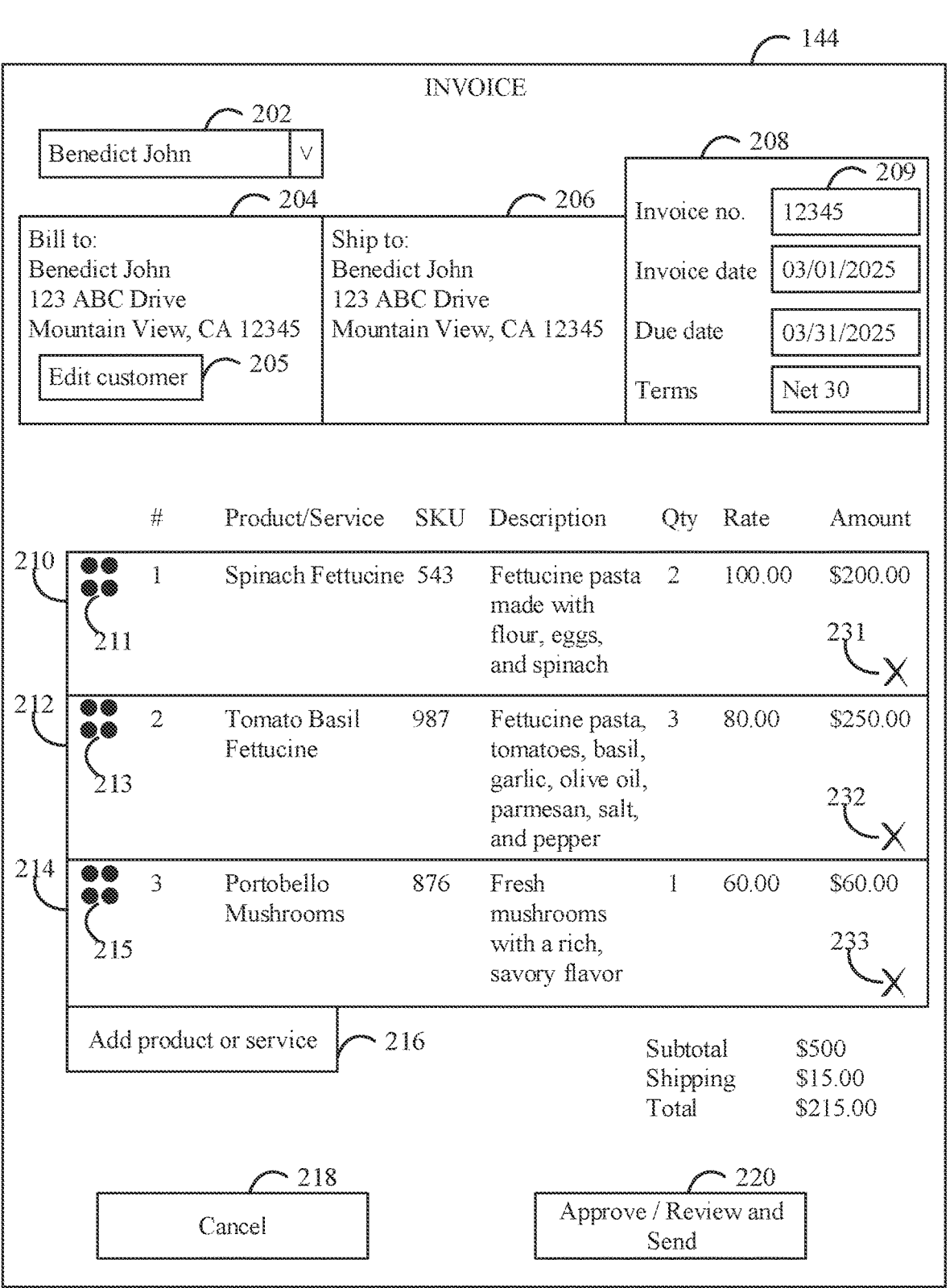
FIG. 2 depicts an example of an automatically created electronic document.

Aspects of the present disclosure provide apparatuses, methods, processing systems, and computer-readable mediums for dynamic interaction with an automatically created electronic document.

A software application may allow for the creation of electronic documents (e.g., invoices, bills, receipts, refund documents, and/or the like), such as via a user interface with various controls that allow information related to the document to be entered by a user. In an example, a user enters identifying information of a customer, an item or service, a quantity, a rate, and/or the like via a user interface, and the application creates an invoice based on the entered information. Creating documents such as invoices can be an inefficient and repetitive process, particularly for larger businesses that create many invoices. Often, a business may create many invoices with the same or similar items, particularly when doing business repeatedly with particular customers.

Existing techniques for creating electronic documents using software applications are limited in their ability to automate aspects of the electronic document creation process due to the dynamic nature of many types of electronic documents. For example, the parties and items included in an electronic invoice may vary considerably between invoices. While there may be data available that could assist a software application in such automation, such as electronic records of communications relating to a given electronic document, this data is generally unstructured and not in a format that can be understood by the software application for the purpose of relating such information to creation of an electronic document.

Existing user interfaces related to electronic document creation generally include an electronic document with blank fields that a user may populate, or may involve asking a user a series of questions via one or more user interface screens.

Techniques described herein address these challenges associated with electronic document creation through a dynamic user interface for review, editing, approval, and/or rejection of electronic documents that were automatically created based on source electronic documents. As described in more detail below with respect to FIGS. 1-6, an electronic document that was automatically created using techniques described herein may be displayed alongside a source electronic document that was used to automatically create the electronic document, and the user interface may be configured such that a user is able to interact with items in the displayed documents in order to trigger display of dynamic explainability content related to the automatic electronic document generation process. For example, if the user moves a cursor over an item in the electronic document or selects the item, this may cause one or more visual elements to be displayed in the user interface indicating a particular portion of the source electronic document that was used to automatically add the item to the electronic document. Such visual elements may include changing one or more formatting parameters of the particular portion of the source electronic document (e.g., highlighting, underlining, italicizing, changing to bold, changing color, changing size, changing font, and/or the like), displaying a pop-up window, displaying a visual connector between the item and the particular portion, and/or the like. Likewise, if the user moves a cursor over a given portion of the source electronic document or selects the given portion, this may cause one or more visual elements to be displayed in the user interface indicating a respective item of the electronic document that was automatically added to the electronic document based on the given portion of the source electronic document. If multiple source electronic documents are used to automatically generate an electronic document, then more than one source electronic document may be displayed alongside the electronic document, and visual indicators may be displayed to indicate which portions of each source electronic document were used to automatically add a given item to the electronic document (e.g., when the user provides input such as hovering over or selecting the given item).

Additionally, the user interface may display a visual representation of a confidence value or level associated with each item in an electronic document, such as based on an amount of confidence that a corresponding match between a portion of a source electronic document and a corresponding entity in a data store is accurate. For example, a graphical element (e.g., a shape such as a circle, or another type of graphic) may be displayed in connection with each item in the electronic document, and attributes of the graphical element may be changed based on the corresponding confidence value (e.g., with different colors, sizes, and/or other attributes indicating different levels or values of confidence). In some embodiments, a confidence value may be directly displayed, such as in the form of a numerical score or other indicator. In other embodiments, aspects of the displayed item details may be changed to indicate such a confidence level, such as through formatting or other aspects of visual appearance.

Furthermore, the user interface may display alternative items that a user may select, such as when a confidence value associated with a given item does not exceed a threshold. For example, one or more user interface elements may be displayed that allow a user to choose between one or more alternative items, such as items that were matched to a corresponding portion of the source electronic document with lower (or equal) confidence scores than the given item currently included in the electronic document. If a user selects such an alternative item via the user interface, the electronic document may be updated to include the alternative item instead of the given item.

Electronic documents displayed via user interfaces described herein may be automatically created through a dynamic machine learning based process that allows relevant data to be automatically extracted from source electronic documents (e.g., electronic records of communications, such as emails) and matched to entities in data stores (e.g., known parties and other items that can be included in an electronic document) for use in automatically creating an electronic document. For example, aspects of the present disclosure may allow customer names, products or services, quantities, and other relevant data (e.g., related to a transaction) to be automatically extracted from emails and/or related documents (e.g., attachments) and matched to known customers, products or services, and/or the like in order to automatically populate an electronic invoice template with such information. End-to-end automated document creation techniques are described in more detail below with respect to FIGS. 7-9.

Feedback received with respect to an electronic document from the user (e.g., via the user interface) may be used to dynamically update aspects of the logic used to automatically create future electronic documents. For example, a matching algorithm may be updated and/or a machine learning model may be re-trained or fine-tuned based on such user feedback in order to reduce false positives and improve the functioning of the system on an ongoing basis.

Embodiments of the present disclosure provide multiple improvements over conventional techniques for electronic document creation. For example, user interfaces described herein provide a variety of technical improvements over existing user interfaces associated with electronic document creation. By automatically populating an electronic document within a user interface based on a source electronic document using extraction and matching techniques described herein, embodiments of the present disclosure avoid the inconvenience and resource utilization that would otherwise be associated with receiving and processing the contents of such electronic documents as manual input from a user. Furthermore, dynamic user interfaces in certain embodiments described herein display an electronic document in a same screen as a source electronic document used to automatically create the electronic document, and enable a user to interact with items in the documents to dynamically trigger display of indications of which items in the source electronic document were used to add certain items to the electronic document, thereby making better use of screen space and enabling a user to efficiently review, understand, edit, and approve/decline automatically generated electronic documents in a manner that was not possible with prior user interfaces. Certain embodiments involve displaying alternative item recommendations (e.g., based on confidence values produced by matching techniques described herein) within the user interface so that a user can efficiently review and select alternative items for inclusion in an electronic document, such as when confidence for a particular item is low, thereby further improving the user interface and the efficiency of electronic document creation, and minimizing computing resource utilization associated with correcting errors in automatically created electronic documents. Additionally, user interfaces described herein improve the explainability of automatic electronic document creation techniques described herein by enabling a user to efficiently view and understand how the automated process produced certain results through interacting with dynamic user interface elements that trigger display of visual indicators of connections between source electronic documents and automatically created electronic documents.

Additionally, by utilizing the dynamic machine learning based techniques described herein to automatically extract relevant data items from source electronic documents, match extracted data items to known entities in a data store, and automatically create an electronic document based on such matching, embodiments of the present disclosure allow for a significant reduction in time, repetition, and computing resource utilization (e.g., utilization of resources such as processing, memory, display, input device, etc.) that would otherwise be associated with the manual or less-automated creation of the electronic document through interaction with a user interface. By providing particular context information such as domain-specific instructions and/or examples in a prompt to a machine learning model along with a source electronic document, techniques described herein allow such a model to function with a higher level of accuracy and to correctly extract relevant data items from the source electronic document even when the model has not been directly or extensively trained for a domain to which the extraction task relates (e.g., electronic invoice creation for a particular user). As used herein, a "domain" may refer to a particular subject, purpose, or context, such as the creation of a specific type of electronic document (e.g., invoices), the creation of electronic documents for a particular user or entity or set of users or entities, a particular software application, and/or the like.

Furthermore, by utilizing a dynamic matching algorithm to match extracted data items to known entities in a data store, such as using a combination of exact lexical matching, fuzzy lexical matching, and/or semantic matching in a manner that is dynamically adapted based on circumstances such as a category (which may also be referred to as type) of the data item, a category of entity that is being search for, and/or a result of an intermediate stage of the matching algorithm, techniques described herein improve upon existing techniques for automatically matching items in software applications through a more tailored and afdaptable approach. Thus, matching algorithms described herein reduce false positives and avoid performing types of matching techniques that are unlikely to be useful in a particular context, thereby avoiding the computing resource utilization that would otherwise be associated with such techniques. For example, if a lexical search produces a result with a confidence score above a threshold, a semantic search and accompany resource utilization may be avoided according to rules of a matching algorithm as described herein. In another example, if a data item is of a type that is well suited to an exact lexical search, such as an item number or other standardized identifier, a fuzzy lexical search and/or semantic search and accompanying computing resource utilization may be avoided according to rules of a matching algorithm as described herein.

Aspects of the present disclosure make use of particular machine learning and automated matching techniques to derive domain-specific and relevant information from source electronic documents that may not be structured or formatted in a manner that would otherwise allow such information to be understood by a computing application for a given domain, and thereby enable a computing application to understand and use such information to automatically create electronic documents in a manner that was not possible with prior techniques.

By utilizing input and feedback from the user to iteratively improve aspects of the automated document creation process, such as through updating the matching algorithm and/or re-training or fine-tuning the machine learning model based on such feedback, techniques described herein provide a continuously-improving feedback loop that reduces false positives and improves performance with each successive iteration.

Additionally, techniques described herein may avoid errors that could otherwise be introduced through the manual creation of electronic documents, thereby avoiding processing, storage, and communication resource utilization associated with auditing, correcting and/or re-sending electronic documents created using software applications.

While certain components of the techniques described herein may be known, embodiments of the present disclosure involve combinations of these components that provide benefits beyond the benefits separately provided by each individual component. For instance, while machine learning techniques in a general sense may be known in the art, while the use of matching algorithms in a general sense may be known the art, and while user interfaces in general may be known in the art, techniques described herein utilize dynamic combinations of these components where a user interface is dynamically updated based on user interactions to provide explainability information and/or recommendations related to an automated electronic document creation process. Furthermore, according to some embodiments, the output from a machine learning model is used in conjunction with a dynamic matching algorithm with respect to a data store associated with a particular domain to gain actionable insight from a source electronic document, thereby allowing electronic documents to be automatically created using domain-specific information identified through this unique combination of techniques. As such, techniques described herein automatically create electronic documents that are more created more efficiently and/or are more dynamically informed and therefore more accurate than electronic documents that could otherwise be produced by a general user interface, a general machine learning technique on its own, and/or through a conventional matching algorithm on its own.

Example Source Electronic Document

FIG. 1 is an illustration of an example source electronic document related to automated electronic document creation. FIG. 1 includes source electronic document 102, which is also described below with respect to FIGS. 7 and 8, and represents an example of such a source electronic document. It is noted that other types of electronic source documents may alternatively be used with embodiments of the present disclosure.

In FIG. 1, electronic source document 102 may be an email sent by a customer to a business. The email is from a sender named "Benedict John" and was sent on Feb. 29, 8024 at 4:15 PM.

The email in FIG. 1 includes the following text in a body of the email:

Hi Martin,

I am mailing you a check this week. Also, I need to place another order. The tomato basil is really selling.

All Fettucine

Spinach 2 cases

Tomato Basil 3 cases

Mushroom 1 case

Thanks,

Benedict John

Gourmet Cafe

While not depicted, the email may also have one or more attachments. The attachment(s) may be in a text format and/or may be images or otherwise may not contain machine-readable text. In one example, an attachment to the email includes a picture of an empty shelf marked tomato basil fettucine pasta.

The business (or its representative) may be a user of a financial management software application, and may have configured the software application to receive incoming emails directed to the business. For example, incoming emails directed to the business may be routed via a web service to a data store or "bucket" and the software application may receive the email via a subscription to a service that informs the software application when new emails are available and/or sends such emails to the software application. The email (and any attachments) may be received by data extractor 710 of FIGS. 7 and 8, as described below. The email (and any attachments) may be processed in order to extract one or more data items from the email and/or attachments, match the extracted one or more data items to one or more entities in a data store, and automatically generate an electronic document based on the extracting and the matching.

Example Electronic Document Automatically Created Using Techniques Described Herein FIG. 2 is an illustration of an example of an automatically created electronic document. FIG. 2 includes electronic document 144, which is further described below with respect to FIGS. 7 and 8, and represents an example of such an electronic document that may be automatically created and displayed in a user interface described herein. It is noted that other types of electronic documents (e.g., refunds, receipts, records, and/or the like) may alternatively be created in embodiments of the present disclosure.

In an example, the electronic document 102 in FIG. 2 is an electronic invoice created based on the email depicted in FIG. 1. The invoice may be displayed in a user interface that allows a user to review contents of the invoice, edit aspects of the invoice, approve the invoice, and/or reject the invoice.

The invoice includes a customer name field 202 that has been automatically populated with "Benedict John". Field 202 may be associated with a drop-down list that allows the user to select alternative customer names from the user's list of customers, and/or may be an editable field that allows the user to type in a different name.

The invoice further includes a billing information field 204 that has been automatically populated with an address of Benedict John. For example, a match may have been determined between the sender of the email and a customer in the user's list of customers (e.g., the customer may be an entity in a data store 730 of FIG. 7), and the known information of that customer (Benedict John), such as in a data store 730 of FIG. 7, may have been used to populate field 204 with the customer's billing address. Field 204 (or another portion of the invoice) may also include a control 205 that, when selected, allows the user to edit the customer's data (e.g., a popup window or different user interface screen may displayed in which the user can edit the customer's billing address and/or other information).

Similarly, the invoice includes a shipping information field 206 that has been automatically populated with a shipping address of Benedict John. The shipping address may be the same or different than the billing address, and may also be determined from information known about the customer (e.g., such information may be stored in a data store 730 of FIG. 7) based on a match between a data item from the source document (e.g., the sender's name from the email) and an entity in the data store (e.g., the name of one of the user's customers).

The invoice further includes an invoice details field 208, which includes details of the invoice. Fields within the invoice details field 208 may include an invoice number, an invoice date, a due date, and terms of the invoice. Field 209, for example, has been automatically populated with an identifier of the invoice. These fields in invoice details field 208 may be automatically populated based on rules and/or contextual information. For example, the invoice number may be randomly or sequentially generated, the invoice date may be determined based on the current date, the due date may be determined based on the invoice date and a billing period length (e.g., 30 days), and the terms may be determined based on rules associated with the user and/or based on information extracted from the source document(s). For instance, "net 30" may mean that the net amount is due in 30 days.

The invoice further includes items 210, 212, and 214, which represent items for which the customer is being invoiced, and which have been automatically populated with information based, for example, on the extracting and matching described below with respect to FIGS. 7-9 (other techniques for automatically generating an electronic document based on a source electronic document are possible). For example, item 210 is for a product named "spinach fettucine," has a SKU of 543, a description, a quantity of 2, a rate of 100.00, and an amount of $200.00. The details of item 210 may have been determined based on a match between "All fettucine" and "Spinach 2 cases" extracted from the email of FIG. 1 and an entity in the data store that corresponds to a product (spinach fettucine) offered by the user. The product name, SKU, description, and rate may have been determined based on known information associated with this product in the data store. The quantity may have been determined based on the email (e.g., "2 cases"). The amount may have been determined based on the rate and the quantity. The details of items 212 and 214 may have been determined and populated in a similar manner.

Items 210, 212, and 214 further include controls 211, 213, and 215, which, when selected, allow a user to drag and drop these items within the list of items, such as to re-order the items within the invoice. Furthermore, items 210, 212, and 214 further include controls 231, 232, and 233, which, when selected, allow a user to delete these items (e.g., remove an item from the invoice).

Control 216 may be configured to, when selected, allow the user to add one or more additional items (e.g., products or services) to the invoice, such as displaying a popup window or other user interface screen that allows a user to select and/or enter details of such additional items.

The invoice also includes control 218, which allows the user to cancel or delete the invoice. Furthermore, the invoice includes control 220, which allows the user to approve the invoice and/or review and send the invoice. In some embodiments, selecting control 220 causes a preview of the invoice as it will be sent to the customer to be displayed so that the user can review and approve the final invoice for sending. When approved, the invoice may be sent to the customer, such as via email or to a software application associated with the customer.

In some embodiments, if no matches are found between data items extracted from a source electronic document and entities in a data store, then an electronic document is not automatically created. In certain embodiments, if one or more matches are determined but not enough matches to automatically create an entire electronic document, a partial electronic document may be automatically created. For example, if the customer information from a transactional email is matched to a customer in a data store but no items are matched (or only a subset of the items potentially mentioned in the email), then a partially-populated electronic invoice may be automatically created with the customer information populated but with no items or only the matched items populated, and the user may interact with the user interface to add items as appropriate. If multiple matches are determined for a given data item, the match with the highest final confidence score may be selected to populate the electronic document. If multiple matches with equal final confidence scores are determined, then multiple options may be recommended to the user via the user interface. For example, one of the matches may be selected based on some (e.g., arbitrary) condition, such as alphabetical order, and used to populate the electronic document, and the other matches with equal final confidence scores may be recommended within the user interface as alternatives.

User feedback with respect to electronic document 722, such as via one or more user interface elements or controls described with respect to FIG. 2, may be used to update the matching algorithm and/or re-train or fine-tune one or more machine learning models, as described below. In some embodiments, training, re-training, or fine-tuning of a machine learning model may be a supervised learning process that involves providing training inputs (e.g., source document content and a prompt) as inputs to the model. The model processes the training inputs and produces outputs (e.g., indicating data items extracted from the input document content, along with confidence scores for the extractions) with respect to the training inputs. The outputs are compared to labels (e.g., known data items present in the input document content) associated with the training inputs to determine the accuracy of the model, and the model is iteratively adjusted until one or more conditions are met. The machine learning model may, for example, comprise one or more neural networks. Neural networks generally include a collection of connected units or nodes called artificial neurons, which loosely model the neurons in a biological brain. The operation of neural networks can be modeled as an iterative process. Each node has a particular value associated with it. In each iteration, each node updates its value based upon the values of the other nodes, the update operation typically consisting of a matrix-vector multiplication. The update algorithm reflects the influences on each node of the other nodes in the network.

Figure 3:
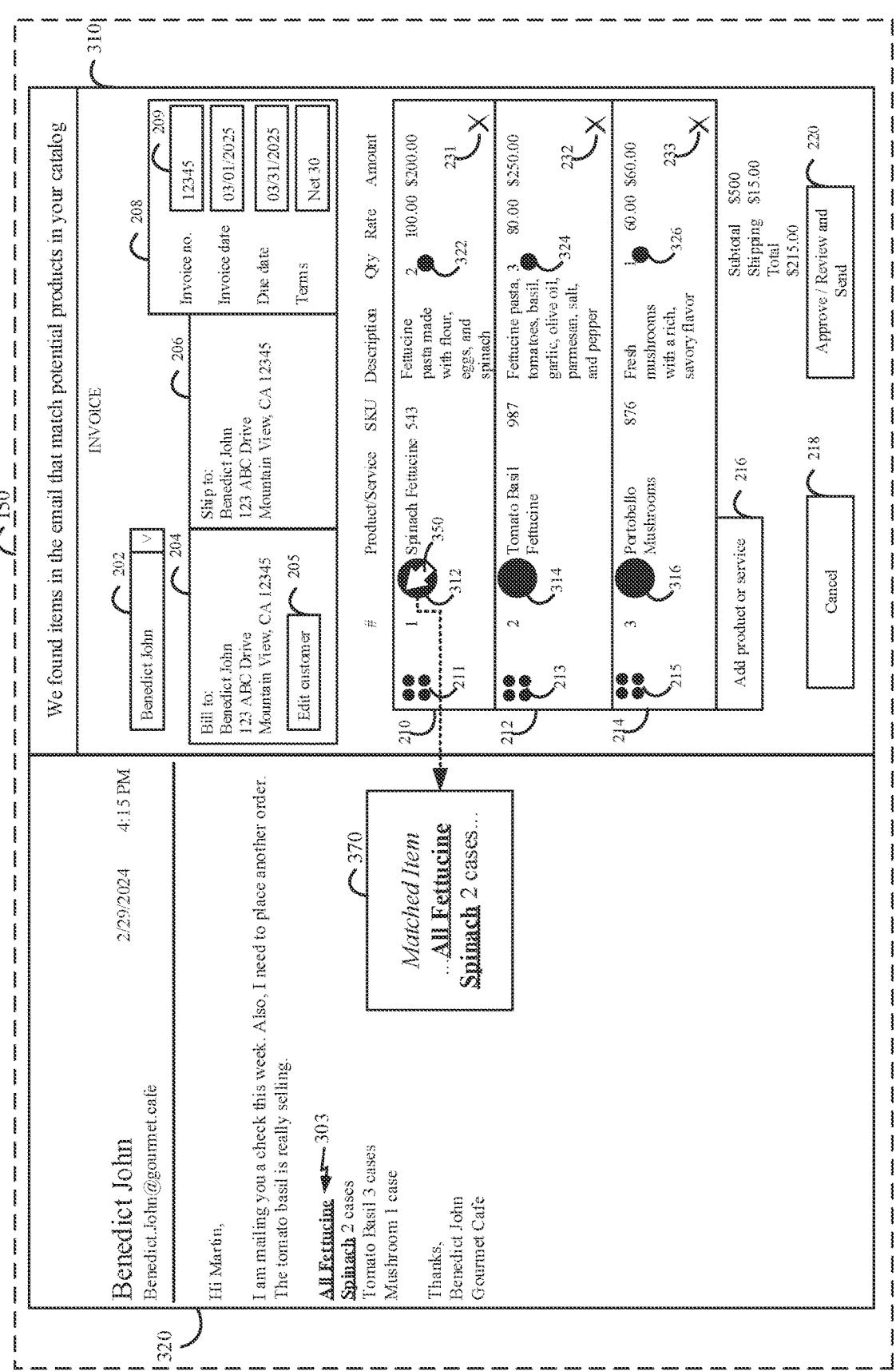
FIG. 3 depicts an example user interface screen for dynamic interaction with an automatically created electronic document.

Example User Interfaces for Dynamic Interaction with Electronic Documents Automatically Created Using Techniques Described Herein FIG. 3 is an illustration of an example user interface screen for dynamic interaction with an automatically created electronic document. FIG. 3 includes user interface 150, described below with respect to FIG. 7, and represents an example of such a user interface. It is noted that the example user interfaces shown in FIGS. 3-6 are not limiting, and other types of user interfaces and user interface elements may be used to implement techniques described herein.

In FIG. 3, user interface 150 includes an electronic document (e.g., electronic document 144 of FIG. 2 and/or FIG. 7) displayed with a source electronic document (e.g., source electronic document 102 of FIG. 1 and/or FIG. 7) that was used to automatically create the electronic document. The electronic document may be displayed in a first panel 310 of the user interface while the source electronic document may be displayed in a second panel 320 of the user interface. Panels 310 and 320 may be in a same screen, and may be adjacent and/or proximate to one another within the screen. A panel may refer to a distinct portion of a user interface screen. Panels are included as examples, and other types of user interface arrangements are possible.

Visual indicators 312, 314, and 316 indicate respective confidence levels associated with items 210, 212, and 214, such as via color (not shown). In one example, if visual indicator 312 comprises a first color this indicates that item 210 has a low confidence level (e.g., a confidence score in a first range), if visual indicator 312 comprises a second color this indicates that item 210 has a medium confidence level (e.g., a confidence score in a second range higher than the first range), and if visual indicator 312 comprises a third color this indicates that item 210 has a high confidence level (e.g., a confidence score in a third range higher than the second range). Color is included as an example, and confidence scores/levels may be indicated in other ways, such as using text, size, shape, formatting, and/or other techniques. Visual indicators 322, 324, and 326 indicate respective confidence levels associated with the quantities of items 210, 212, and 214, such as via color or another technique as described above with respect to visual indicators 312, 314, and 316. Confidence scores/levels may be determined based on confidence scores produced by data matcher 720 of FIG. 1 (e.g., final confidence scores) for matches that resulted in items 210, 212, and 214 (and, in some embodiments, the quantities of these items) being included in the electronic document.

A user may dynamically interact with user interface 150, such as using a cursor 350 or via touch, voice, gestures, and/or the like. When the user interacts with item 210 (and/or, in some embodiments, visual indicator 312 more particularly), such as via cursor 350 (e.g., hovering over, selecting, and/or the like), display of a visual indicator 303 (and/or, in some embodiments, visual indicator 370) is triggered. Visual indicator 303 indicates that item 210 was automatically added to the electronic document based on a particular portion of the source electronic document (e.g., the text "All Fettucine" and "Spinach") that was automatically matched to a corresponding entity in the data store (e.g., the product named "Spinach Fettucine") that is represented in item 210. Visual indicator 303 may comprise, for example, a change to the color, size, font, formatting, or other attribute of the relevant portion(s) of the text of the source document (represented in FIG. 3 by bold and underlined text). Furthermore, visual indicator 370 may be displayed along with visual indicator 303 or instead of visual indicator 303 based on the same user interaction, or when a separate user interaction is performed such as selecting item 210 by clicking on or touching the item 210 or associated visual indicator 312 (e.g., as opposed to hovering without clicking). Visual indicator 370 may comprise a pop-up window that includes an indication that a particular portion of the source electronic document was automatically matched to the entity represented by item 210. For example, visual indication 370 may include at least a portion of the text of the source electronic document with the relevant (e.g., matching) portion displayed with different attributes, such as different formatting or the like (e.g., represented in FIG. 3 by bold and underlined text). In some embodiments, relevant portions of source document text are highlighted to indicate relevance to an item that has been interacted with.

In some embodiments, visual indicator 303 and/or visual indicator 370 may no longer be displayed if the user subsequently unselects item 210 (or its associated visual indicator 312), moves cursor 350 away from item 210 (or its associated visual indicator 312), and/or otherwise performs a different subsequent interaction.

The dynamic user interface elements described with respect to FIG. 3 enable a user to efficiently review an automatically created electronic document while understanding why each item was automatically added to the electronic document based on relevant portions of a source electronic document. For example, visual indicator 303 and/or visual indicator 370 (or another similar visual indicator) may provide the user with relevant information in a manner that makes optimal use of screen space and allows the user to efficiently determine whether item 210 should in fact be included in the electronic document or if item 210 should be removed or replaced with a different item (e.g., if the match indicated by visual indicator(s) 303 and/or 370 is incorrect).

Furthermore, as described above with respect to FIG. 5, the user interface may include various controls that allow the user to select alternate customers, edit customer information, edit invoice details, move items within the electronic document (e.g., via drag and drop input), delete items from the electronic document, add additional items to the electronic document, cancel or reject the electronic document, and/or approve the electronic document.

Figure 4:
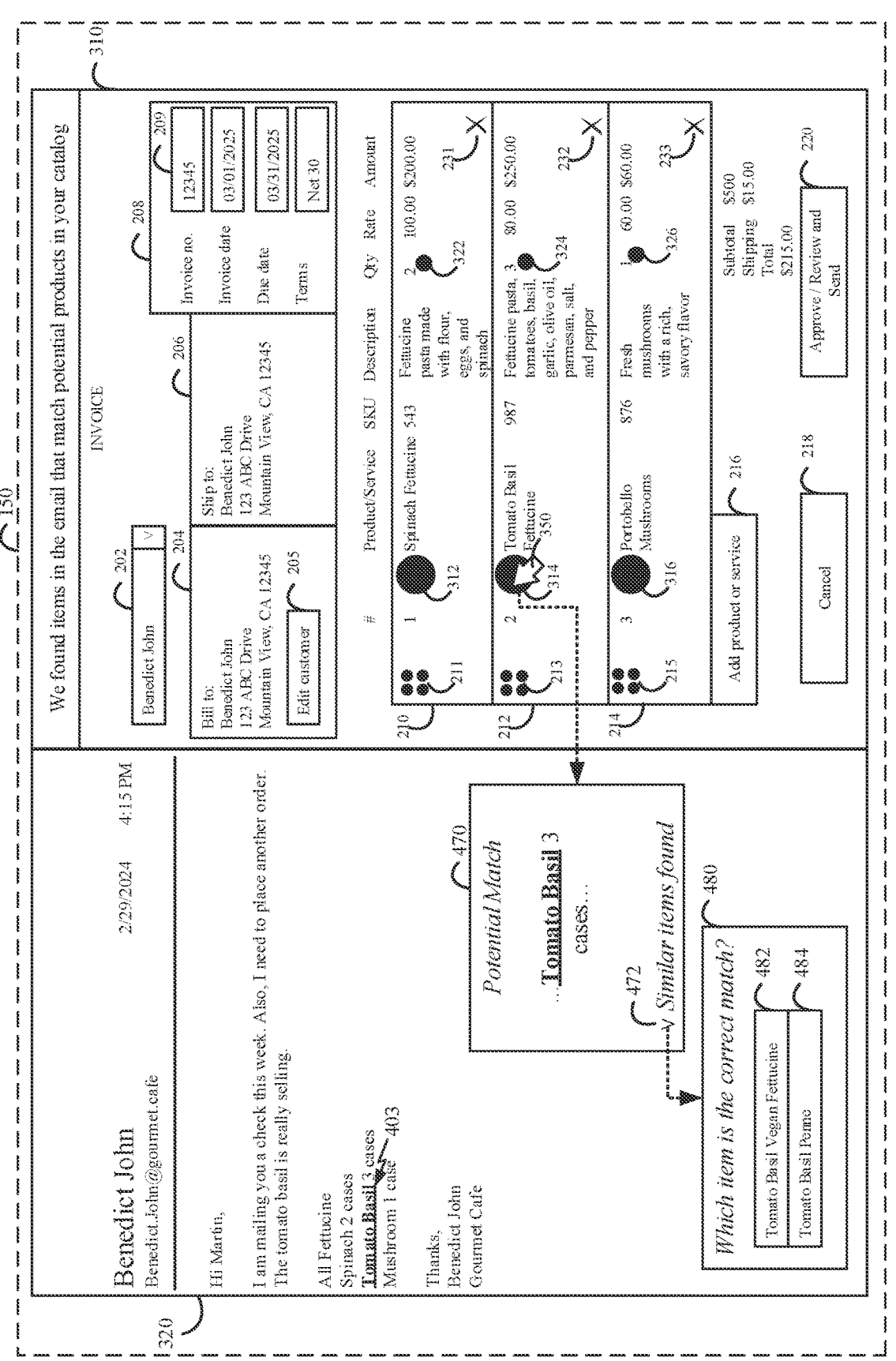
FIG. 4 depicts another example user interface screen for dynamic interaction with an automatically created electronic document.

FIG. 4 is an illustration of another example user interface screen for dynamic interaction with an automatically created electronic document. FIG. 4 includes user interface 150 of FIG. 3 and/or FIG. 7, and represents another example of such a user interface. FIG. 4 includes panels 310 and 320 of FIG. 3.

In FIG. 4, the user has interacted with item 212 (and/or, more particularly, visual indicator 314), such as using cursor 314 (e.g., hovering, selecting, and/or the like), which has triggered the display of visual indicator 403 (and, in some embodiments, visual indicator 470).

Visual indicator 403 indicates a portion of the source electronic document (in this case, the text "Tomato Basil") that was used to automatically add item 212 to the electronic document. For example, the text "Tomato Basil" may be a data item that was extracted from the source electronic document and matched to an entity in the data store (e.g., a product named "Tomato Basil Fettuccine") represented by item 212 using techniques described above.

Furthermore, visual indicator 470 may be displayed along with visual indicator 403 or instead of visual indicator 403 based on the same user interaction, or when a separate user interaction is performed such as selecting item 212 by clicking on or touching the item 212 or associated visual indicator 314 (e.g., as opposed to hovering without clicking). Visual indicator 470 may comprise a pop-up window that includes an indication that a particular portion of the source electronic document was automatically matched to the entity represented by item 212. Furthermore, visual indicator 470 indicates that the relevant portion is a "potential match" and that other potential matches were also automatically identified. For example, the visual indicator 314 associated with item 212 may indicate a low confidence score, and the user may click on visual indicator 314 for more information, causing visual indicator 470 to be displayed.

In one example, the matching algorithm returned multiple potential matches for the data item "Tomato Basil" (e.g., including products named Tomato Basil Fettucine, Tomato Basil Vegan Fettucine, and Tomato Basil Penne), such as with the same or different confidence scores. Tomato Basil Fettucine may have been selected as a match because it had the highest confidence score or, if multiple matches had equal confidence scores, based on some other condition. A control 472 in visual indicator 470 may, when selected or otherwise interacted with, cause an additional window 480 to be displayed including alternate item recommendations 480 and 484 (e.g., corresponding to the products named Tomato Basil Vegan Fettucine and Tomato Basil Penne). If the user selects alternate item recommendation 482 or 484, the corresponding alternate item to be added to the electronic document (e.g., in place of item 212). While not shown, some embodiments may involve displaying indicators of confidence scores or levels associated with each of alternate item recommendations 482 and 484. For example, the entities represented by alternate item recommendations 482 and 484 may have been selected to recommend based on these entities having the next highest confidence scores (e.g., above a minimum threshold) after the item represented by item 212 as potential matches for the data item (e.g., "Tomato Basil" from the source electronic document).

It is noted that window 480 is included as an example, and other methods of displaying alternate item recommendations are possible with techniques described herein. Presenting alternate item recommendations in the user interface may allow the user to efficiently determine whether the item that was automatically included in the electronic document was correct, and/or if it should be replaced by an alternate item that was also automatically identified as a potential match according to techniques described herein.

Figure 5:
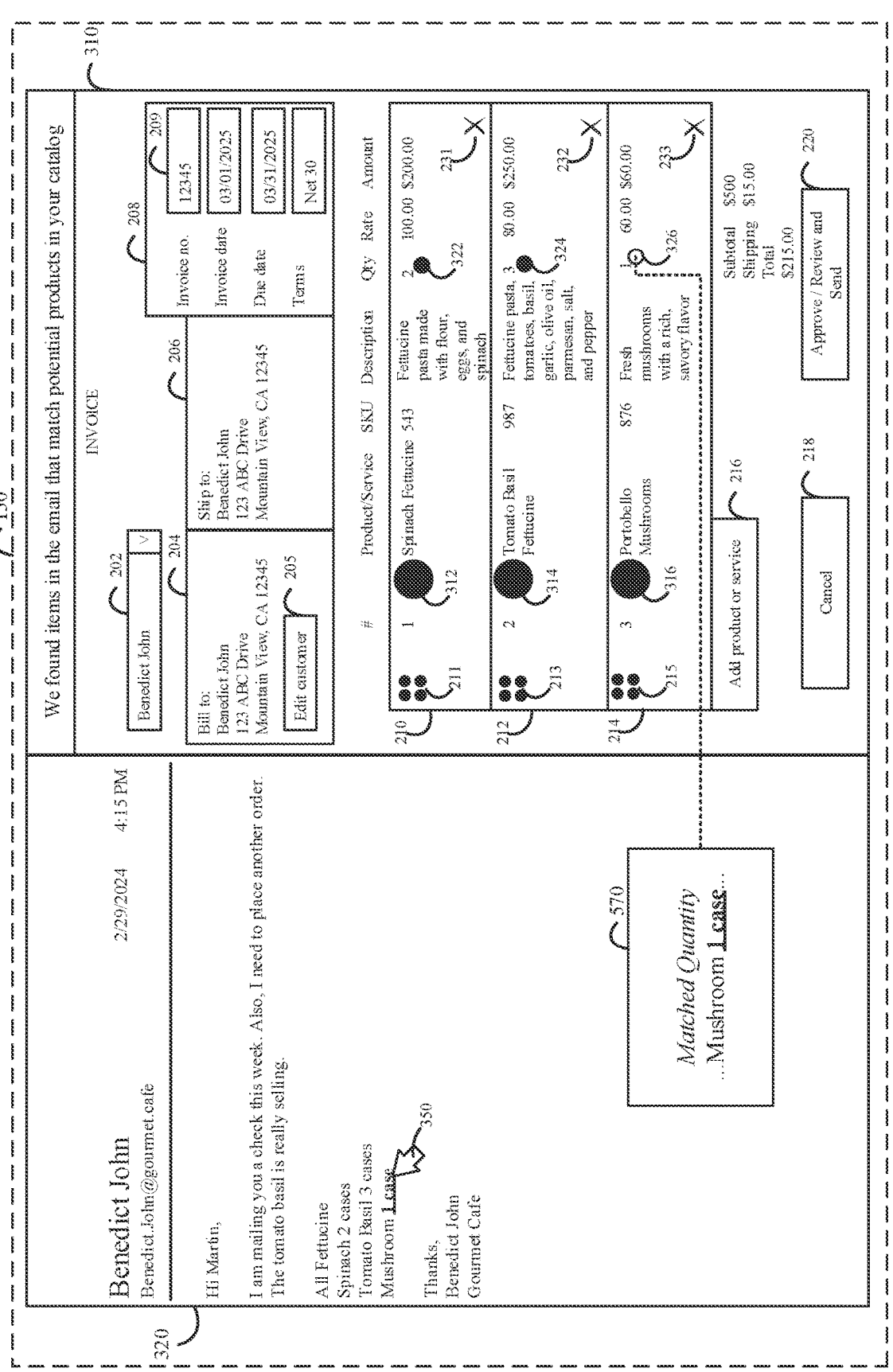
FIG. 5 depicts another example user interface screen for dynamic interaction with an automatically created electronic document.

FIG. 5 is an illustration of another example user interface screen for dynamic interaction with an automatically created electronic document. FIG. 5 includes user interface 150 of FIG. 3, FIG. 4, and/or FIG. 7, and represents another example of such a user interface. FIG. 5 includes panels 310 and 320 of FIGS. 3 and 4.

In FIG. 5, the user has interacted with a particular portion of the source electronic document displayed in panel 320 (e.g., the text "1 case"), such as using cursor 314 (e.g., hovering, selecting, and/or the like). This user interaction has caused the text that was interacted with to be changed (e.g., to a different format, font, color, size, and/or the like, represented in FIG. 5 by bold and underlined text), and has triggered display of a visual indicator that indicates a particular item (or component of an item) in the electronic document that was automatically added to the electronic document based on the text that was interacted with. For example, visual indicator 326 of the quantity of item 214 may be changed (e.g., in shape, size, graphic, color, and/or the like) and/or one or more other indicators may be displayed to indicate that the quantity of item 214 (showing a quantity of 1) was populated based on the text from source electronic document that the user interacted with (e.g., "1 case").

Furthermore, visual indicator 570 may be displayed along with a change to visual indicator 326 or instead of a change to visual indicator 326 based on the same user interaction, or when a separate user interaction is performed such as selecting the text "1 case" by clicking on or touching the text (e.g., as opposed to hovering without clicking). Visual indicator 570 may comprise a pop-up window that includes an indication that a particular portion of the source electronic document that the user has interacted with was automatically matched to quantity shown in item 214.

Figure 6:
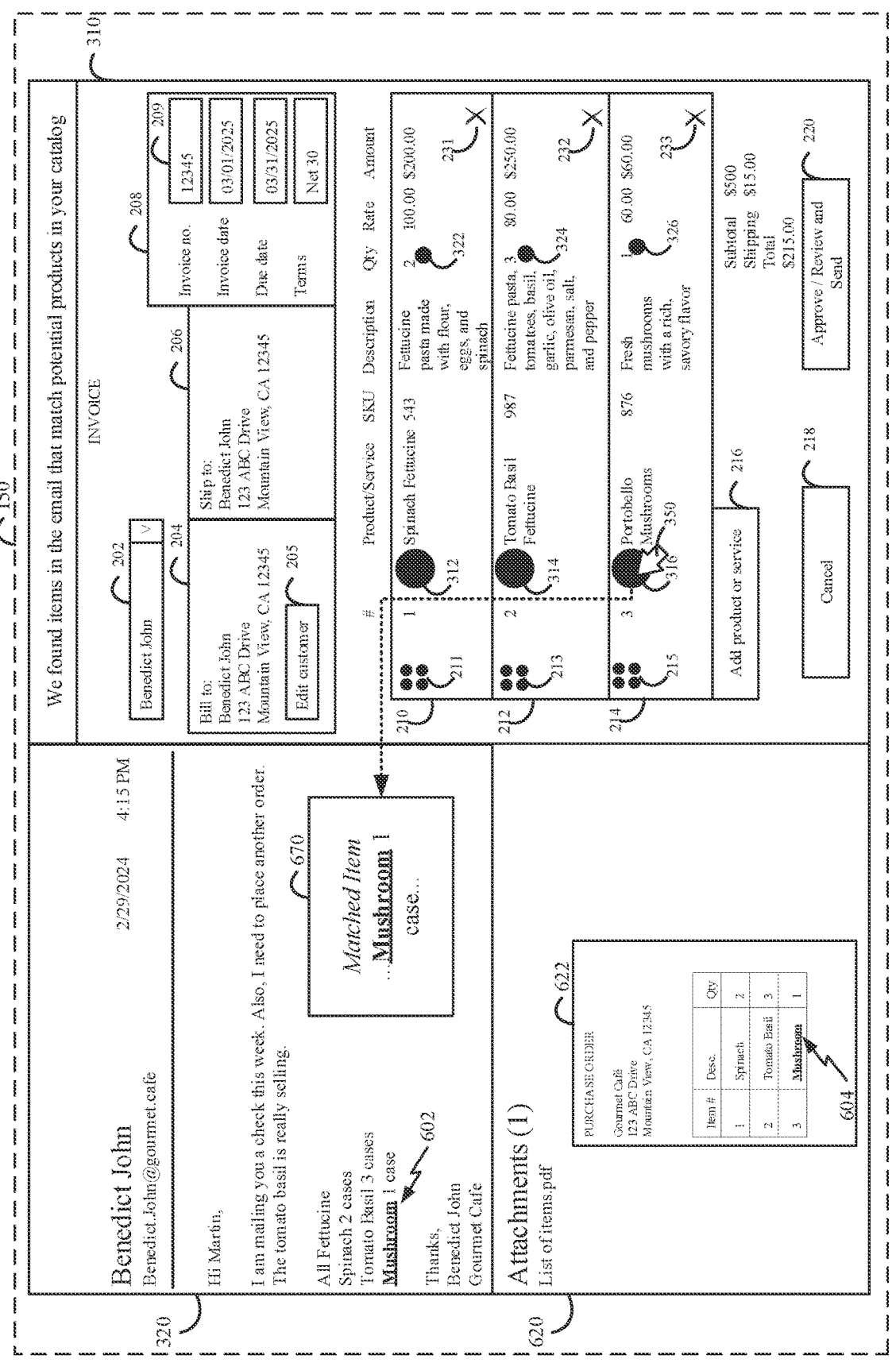
FIG. 6 depicts another example user interface screen for dynamic interaction with an automatically created electronic document.

FIG. 6 is an illustration of another example user interface screen for dynamic interaction with an automatically created electronic document. FIG. 6 includes user interface 150 of FIG. 3, FIG. 4, FIG. 5, and/or FIG. 7, and represents another example of such a user interface. FIG. 6 includes panels 310 and 320 of FIGS. 3-5.

FIG. 6 further includes an additional panel 620 that displays one or more additional electronic documents that are associated with the electronic document displayed in panel 320. For example, panel 620 may display an attachment to an email that is displayed in panel 320. Panel 620 may, in some embodiments, display data about such additional document(s), such as a count of such additional documents and/or the title(s) or file name(s) of such additional document(s). Panel 620 includes an additional electronic document 622, which may correspond to an associated document 704 of FIG. 7.

In the example depicted in FIG. 6, additional electronic document 622 is a "purchase order" document that was attached to the email displayed in panel 320. The purchase order may have been a portable document format (PDF) document, and OCR techniques may have been used by data extractor 710 of FIG. 7 to extract the text from the document. Additional electronic document 622 may represent a formal purchase order that the customer (Benedict John) attached to his email to the user.

In FIG. 6, the user has interacted with item 214 (and/or, more particularly, visual indicator 316), such as using cursor 314 (e.g., hovering, selecting, and/or the like), which has triggered the display of visual indicators 602 and 604 (and, in some embodiments, visual indicator 670).

Visual indicator 602 indicates a portion of the source electronic document (in this case, the text "Mushroom") that was used to automatically add item 214 to the electronic document. For example, the text "Mushroom" may be a data item that was extracted from the source electronic document and matched to an entity in the data store (e.g., a product named "Portobello Mushrooms") represented by item 214 using techniques described above.

Similarly, visual indicator 604 indicates a portion of the additional electronic document 622 (in this case, the text "Mushroom" in the purchase order) that was additionally or alternatively used to automatically add item 214 to the electronic document. For example, the text "Mushroom" may be a data item that was extracted from the additional electronic document (e.g., attached to the email) and matched to an entity in the data store (e.g., a product named "Portobello Mushrooms") represented by item 214 using techniques described above. The match between "Mushroom" in the purchase order and the product "Portobello Mushrooms" may have been used by data matcher 720 of FIG. 7 to confirm and/or strengthen the confidence associated with the match between "Mushroom" in the email and the and the product "Portobello Mushrooms" that was also determined. In alternative embodiments, a match may have been based only on text from an associated electronic document (e.g., attachment).

Furthermore, visual indicator 670 may be displayed along with visual indicator 602 and 604 or instead of visual indicators 602 and 604 based on the same user interaction, or when a separate user interaction is performed such as selecting item 214 by clicking on or touching the item 214 or associated visual indicator 316 (e.g., as opposed to hovering without clicking). Visual indicator 670 may comprise a pop-up window that includes an indication that a particular portion of the source electronic document was automatically matched to the entity represented by item 214. In some embodiments, matching text from the additional electronic document 622 may also be indicated in visual indicator 670 and/or may be indicated in a separate visual indicator (e.g., an additional pop-up window that is not shown in FIG. 6).

Displaying additional electronic documents such as attachments that were also used to create an electronic document in a same screen as the electronic document (and a source electronic document) in a dynamically interactive manner as described herein provides further explainability and ease of review with respect to the automatic electronic document creation process. In some embodiments, one or more of panels 310, 320, and/or 620 may be collapsible, resizable, movable, and/or the like. For example, user interface controls may be displayed that allow the user to collapse (e.g., minimize or shrink) a panel, move a panel (e.g., using drag and drop input), resize a panel (e.g., by clicking and dragging), close a panel, and/or the like.

In some embodiments, such as when a mobile device or other device with limited display space is used to display user interface 150, panels 310, 320, and/or 620 may be scrollable, such as displaying only part of a given electronic document and having user interface controls that allow the user to scroll and view the rest of the given electronic document.

In certain embodiments, only one panel is displayed initially, such as panel 310. In such an embodiment, the user may interact with the electronic document displayed in panel 310 to trigger display of visual indicators such as visual indicator 670 and/or to trigger the display of additional panels, such as panel 320 and/or 620. In one example, only panel 310 is displayed and the user interacts with item 214 (e.g., a control associated with item 214 that enables the user to view the source of the item) to trigger display of visual indicator 670 in the same screen as panel 310. Then, the user may interact with visual indicator 670 (e.g., clicking on the text in visual indicator 670 or a control in visual indicator 670) to trigger display of panel 320 and/or 620 (e.g., along with panel 310 or in place of panel 310 within the screen). Other embodiments are possible without departing from the scope of the present disclosure.

Figure 7:
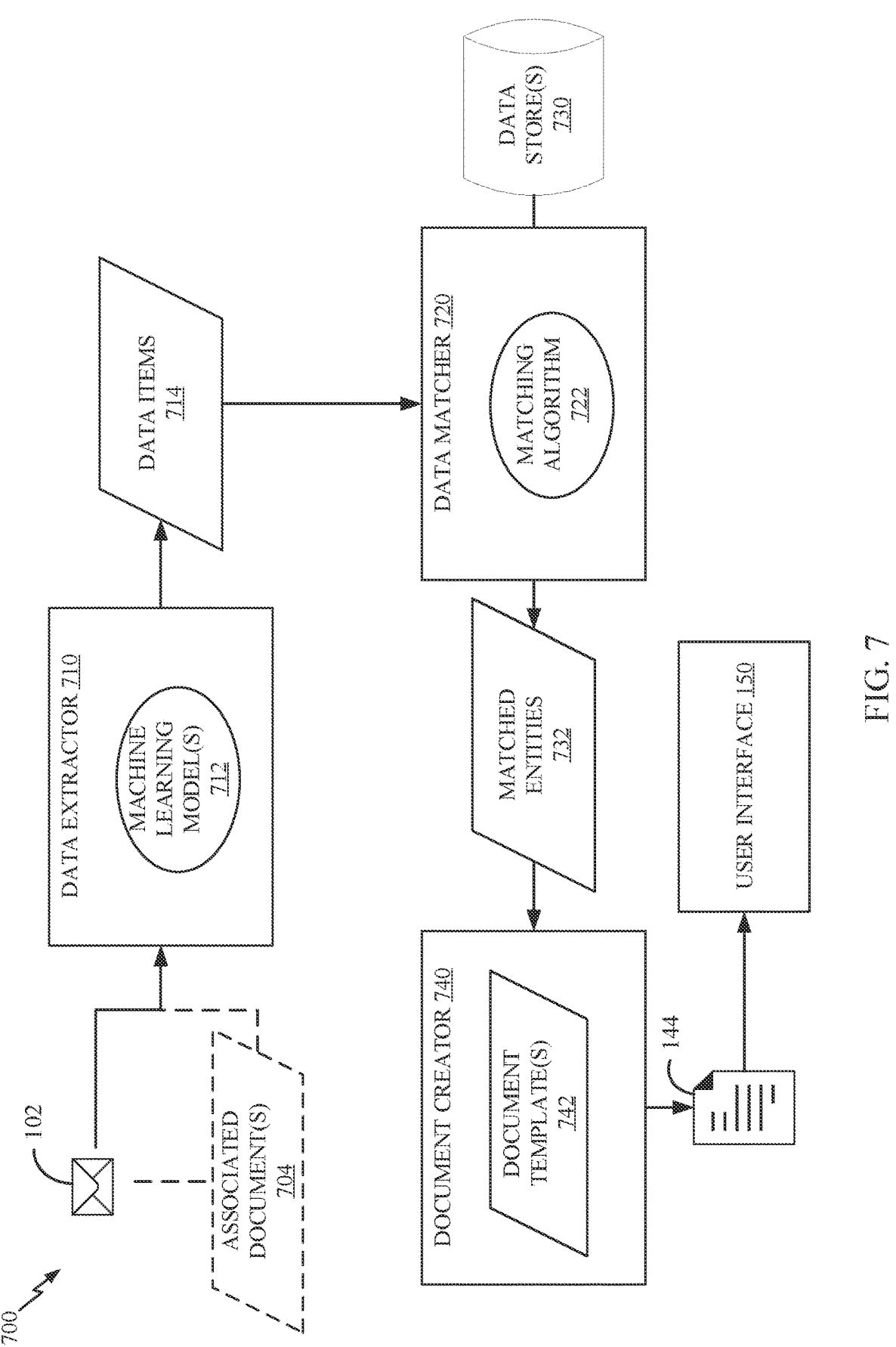
FIG. 7 depicts an example computing environment related to automated electronic document creation and dynamic interaction with an automatically created electronic document.

Example Computing Environment for Automated Electronic Document Creation and Associated Dynamic User Interface FIG. 7 depicts an example computing environment 700 related to automated electronic document creation and dynamic interaction with an automatically created electronic document, according to aspects of the present disclosure. Computing environment 700 includes various computing components that perform techniques for extracting data items from electronic source documents, matching extracted data items to entities in data stores, automatically creating electronic documents based on the extracting and matching, and enabling and dynamic interaction with the automatically created electronic document. These computing components may be implemented via one or more computing devices, such as system 1100 of FIG. 11, described below.

A source electronic document 102 (and, in some embodiments, one or more associated documents 704) are processed by a data extractor 710 using one or more machine learning models 712 in order to extract data items 714. In one example, source electronic document 102 is an electronic record of a communication related to a transaction, such as an email. Associated document(s) 704 may, for example, be one or more attachments to such an email, and/or may otherwise be referenced by or associated with source electronic document 102. An example of a source electronic document 102 is described above with respect to FIG. 1.

Data extractor 710 generally performs operations related to using one or more machine learning models 712 to extract relevant data items from source electronic documents. In an embodiment, data extractor 710 is configured to provide inputs to a machine learning model 712 based on source electronic document 102 (and, in some embodiments, associated document(s) 704) along with a prompt. In some embodiments, data extractor 710 first extracts text from source electronic document 102 (and, in some embodiments, associated document(s) 704), and then provides the extracted text as inputs to the machine learning model 712. The prompt may include natural language instructions to extract particular types of data items from the input document content, and may include context information to aid in the extraction, such as domain-specific instructions and/or examples that demonstrate how the machine learning model 712 should perform the extraction under particular conditions.

In one example, a machine learning model 712 is a natural language processing machine learning model such as a large language model (LLM) (e.g., a generative pre-trained (GPT) model), that has been trained on a large set of training data (e.g., across a plurality of domains), and is capable as a result of such training to perform a wide variety of language-related tasks in response to natural language prompts. Training of the machine learning model 712 may involve supervised and/or unsupervised machine learning techniques. In some embodiments the machine learning model 712 has been fine-tuned for one or more particular domains, such as for use with a particular software application or for a specific purpose, while in other embodiments the machine learning model 712 has been trained in a more general fashion and has not been fine-tuned in such a manner.

The prompt provided to the machine learning model 712 may, for example, specify that the machine learning model 712 is to populate a set of variables or fields in a particular structured object, such as a JavaScript Object Notation (JSON) object, with data extracted from the input document content according to certain rules. For example, the prompt may specify the variables and/or fields to be populated, and may be provide domain-specific instructions and/or examples to aid in the extraction. In one embodiment, the prompt instructs the machine learning model 712 to identify a main intent of input document content, specifies a list of possible intents that can be identified, and indicates intent-specific rules for extracting data items when each of the possible intents is identified. Intent-specific rules may, for example, include rules indicating that if a particular intent is identified then the machine learning model 712 is to categorize and/or parse the input document content in a particular manner. One example of such a rule is an indication that if the general intent of the document content is "transactional," then the machine learning model 712 is to determine if the document content resembles a purchase order from a customer and, if it does resemble such a purchase order, to categorize the document content as a "sales invoice". Another example of such a rule is an indication that if the general intent of the document content is "transactional," then the machine learning model 712 is to populate a TransactionType variable (e.g., one of the variables included in the list of variables to be populated that is provided in the prompt) with only one option selected from: sales invoice, purchase bill, estimate, or unknown. The prompt may also instruct the machine learning model 712 to extract certain data items only if mentioned explicitly in the input document content, such as a product identification number or stock keeping unit (SKU), a quantity, and/or the like. The prompt may also instruct the machine learning model 712 to derive terms associated with a transaction, and may indicate how a "terms" variable is to be populated, such as indicating that if the input document content specifies a commitment to make payment after one week of receiving an invoice then the terms should be populated with "net 7 days" or the like. In some cases, the prompt instructs the machine learning model 712 to populate certain variables with an empty string (e.g., " ") under certain conditions, such as if certain intents or conditions cannot be identified in the input document content. In some cases, the prompt may further specify that the machine learning model 712 is to capture any additional available data about particular entities such as a customer or vendor, such as a name, email, phone number, address, company name, and/or the like.

The machine learning model 712, in response to being provided with the prompt and the input document content, may output extracted data items 714, such as in the form of a structured object (e.g., JSON object) with relevant variables populated with extracted information, according to the instructions included in the prompt. For example, the machine learning model 712 may be a neural network that processes the input document content through various layers (e.g., constructed through a training process based on a large training data set) according to the prompt in order to extract and output data items 714. Operation of data extractor 710 is described further below with respect to FIG. 8.

Data items 714 are provided to a data matcher 720, which is configured to perform operations related to matching data items 714 to elements in one or more data stores 730. Data store(s) 730 generally represent databases, repositories, and/or other data storage entities that contain data related to one or more software applications. In one example, a data store 730 is associated with a financial management software application and incudes data related to a user (e.g., business), such as names and information of customers, information about inventory items such as products or services (e.g., names, identifiers, descriptions, prices, and/or the like), and other types of information. Such information may be provided by a user and/or otherwise determined or retrieved, such as from one or more separate data sources.

Data matcher 720 applies a matching algorithm 722 in order to dynamically match data items 714 to entities in data store(s) 730. In some embodiments, matching algorithm 722 involves dynamically selecting lexical and/or semantic matching techniques based on categories of data items 714 and/or based on results of prior matching operations. In one example, a determination is made of whether to perform an exact lexical search or a fuzzy lexical search based on a category of a given data item 714 or a category of entity that is being searched for in the data store. An exact lexical search generally involves a search of one or more data stores 730 for an exact sequence of characters. A fuzzy lexical search generally involves a search of one or more data stores 730 for a sequence of characters while allowing some amount of difference (e.g., not requiring an exact match but allowing some amount of variation). Some types of data items may be well suited to an exact lexical search, while other types of data items may not be well-suited to an exact lexical search. For example, a numerical identifier such as a SKU may be well-suited to an exact lexical search because such an identifier is unlikely to be represented in different ways in different places. By contrast, a name of a product or service may not be well-suited to an exact lexical search because such data items may be represented in different ways in different places (e.g., due to abbreviations, differing terminology, spelling variations, typographical errors, and/ or the like). Thus, matching algorithm 722 may involve dynamically determining whether to apply an exact lexical search or a fuzzy lexical search for a given data item 714 based on a category of the given data item 714 (e.g., the category of the given data item may be indicated by the output from the machine learning model, such as by the variable in a structured object that the data item corresponds to) or a category of entity that is being searched for in the data store. It is noted that an entity in a data store may include stored data items, such as particular items of data about the entity. In an example, an entity is a product and a stored data item within the entity is a name of the product. An entity may be identified as a match based on one or more stored data items within the entity being matched to one or more data items from a source electronic document. In other embodiments, an entity may be referred to as a stored data item.

Some types of data items, such as longer strings, may not be well-suited to a lexical search at all. As such, in some cases, matching algorithm 722 may involve performing a semantic search either based on a category of the data item or based on a result of an initial lexical search (e.g., if a confidence score produced by a lexical search does not exceed a threshold). A semantic search generally involves a search for entities that have a similar semantic meaning to a given data item, such as based on embeddings. For example, an embedding of a given data item 714 may be generated and compared to embeddings of entities in data store(s) 730 using a similarity measure such as cosine similarity. An embedding generally refers to a vector representation of an entity that represents the entity as a vector in n-dimensional space such that similar entities are represented by vectors that are close to one another in the n-dimensional space. Embeddings of data items 714 and entities in data store(s) 730 may be generated through the use of an embedding model, such as a neural network or other type of machine learning model that learns a representation (embedding) for an entity through a training process that trains the neural network based on a data set, such as a plurality of features of a plurality of entities. In one example, the embedding model comprises a Bidirectional Encoder Representations from Transformer (BERT) model, which involves the use of masked language modeling to determine embeddings. In a particular example, the embedding model comprises a Sentence-BERT model. In other embodiments, the embedding model may involve embedding techniques such as Word2Vec and GloVe embeddings. These are included as examples, and other techniques for generating embeddings are possible. Two embeddings may be considered a match with one another if they are within a threshold distance of one another, such as based on a cosine similarity computation. In some embodiments, a semantic search is only performed for a data item 714 if a lexical search is unsuccessful and/or if a confidence score associated with a result of a lexical search (e.g., exact and/or fuzzy) does not exceed a threshold. In such embodiments, a semantic search may be avoided if a lexical search returns a match with a confidence score above a threshold. In other embodiments, an exact lexical search, a fuzzy lexical search, and/or a semantic search may be performed for every data item regardless of type/category. For example, confidence scores associated with results of such searches may be boosted or weighted differently according to rules and/or based on categories of data items.

One or more confidence scores associated with results of performing one or more lexical and/or semantic searches may be used to determine a final match score between a given data item 714 and an entity in data store 730. For example, a lexical confidence score and a semantic confidence score may be combined (e.g., through a weighted average, where different types of searches are weighted differently based on categories of data items) and/or normalized to produce a final match score that is used to determine whether a match has been found. In some cases, a match may be based on comparing multiple data items 714 to information associated with a single entity in a data store 730. For example, if data items 714 includes a name, address, email, phone number, and/or business name associated with a single person (e.g., customer), each of these data items may be compared to corresponding information associated with a given person (e.g., customer) in a data store 730 using one or more matching techniques that are dynamically selected based on each individual data item in order to determine whether the overall entity (e.g., customer) is a match. In another example, if data items 714 includes a name and a description of a single item (e.g., product or service), each of these data items may be compared to corresponding information associated with a given item (e.g., product or service) in a data store 730 using one or more matching techniques that are dynamically selected based on each individual data item in order to determine whether the overall entity (e.g., product or service, or particular variant of a product or service) is a match. Results of various searches or matching techniques may be normalized, such as to produce confidence scores between 0 and 1, so that such results can be compared at a common scale. In some cases, a boost is given to one or more confidence scores involved in matching algorithm, such as based on a category of a given data item 714. For example, if a category of a given data item is such that a semantic search is expected to provide more accurate results than a lexical search, then the confidence score associated with results of a semantic search for the given data item may be boosted or weighted more highly than one or more corresponding confidence scores associated with results of an exact lexical search and/or a fuzzy lexical search for the given data item when computing the final match score. In certain embodiments, a confidence score produced by a given search type that does not exceed a particular threshold is excluded from the final match score computation in order to reduce noise. Operation of data matcher 720 is described further below with respect to FIG. 9.

One or more matched entities 732 resulting from the matching algorithm 722 performed by data matcher 720 are provided to a document creator 740, which is configured to perform operations related to automatically creating an electronic document 144. For example, matched entities 732 may include one or more entities from data store(s) 730 that have been matched to one or more data items 714. In one particular example, matched entities 732 includes a customer's name and information, one or more products or services being purchased by the customer, the details of such products or services, the quantities of such products or services that are being purchased, and/or the like.

Document creator 740 may use one or more document templates 742 in order to automatically generate an electronic document 144 based on matched entities 732. For example, a document template 742 may be a template of an electronic invoice that includes one or more fields or variables that can be dynamically populated based on matched entities 732. Document creator 740 may insert information associated with matched entities 732 into appropriate fields and/or variables of such a document template 742 in order to create electronic document 144. For example, as described in more detail above with respect to FIG. 2, electronic document 144 may be an electronic invoice that includes details of a particular customer and details of one or more particular items and/or services for which the particular customer is being billed.

In some embodiments, electronic document 144 is displayed via a user interface 150 after being automatically created. A user (e.g., a representative of a business) may review electronic document 144 via the user interface 150, and may interact with one or more user interface controls to provide feedback with respect to electronic document 144, such as editing, accepting, and/or rejecting electronic document 144. This user feedback may be used to modify matching algorithm and/or one or more machine learning models 712 in an interactive feedback loop for improved performance. For example, if the user modifies a value in electronic document 144, this modification may be used as a ground truth label in order to fine-tune or re-train a machine learning model 712 to correctly extract such a value in the future. Such a modification of a value may also or alternatively be used to update matching algorithm 722 so that such a value is more accurately matched in the future. For example, if a semantic search for a corresponding data item had returned a high confidence value in the matching process, then the user's subsequent modification or rejection of a value that is based on such a match may indicate that semantic searches are not well-suited for the category of that data item, and matching algorithm 722 may be modified such that semantic searches are not performed or are weighted less highly for that category of data item in subsequent matching operations. A user's approval of electronic document 144 may be used as a ground truth label indicating that the outputs from machine learning model(s) 712 and/or matching algorithm 722 were correct, and may be used to reinforce and/or re-train these aspects of the system.

User interface 150 may display source electronic document 102 (and, in some embodiments, any associated document(s) 704) along with electronic document 144. In some aspects, user interface 150 may be configured such that when a user interacts with an item in electronic document 144 via user interface 150 a visual indication is displayed indicating a portion of source electronic document 102 that relates to the item, such as a string of text from electronic source document 102 that was matched by data matcher 720 to a matched entity 732 corresponding to the item. Similar visual indicators may also be displayed when a user interacts with items in source electronic document 102 and/or associated document(s) 704. Interaction may include, for example, hovering a cursor over an item, selecting an item, and/or the like.

Additionally, user interface 150 may display visual indicators of confidence values associated with items in electronic document 150. For example, the confidence values may be the final confidence scores produced by data matcher

720 for particular matches that resulted in including particular items in electronic document 144. The visual indicators of confidence may include color, formatting, shape size, font, graphics, text, numbers, and/or the like.

Furthermore, user interface 150 may display alternative items (e.g., alternative matches produced by data matcher 720 that were not automatically selected for inclusion in electronic document 144) and allow a user to review and select such items for inclusion in electronic document 144, such as in addition to or in place of other items in electronic document 144. In one example, if there are multiple matches with equal or similar confidence scores for a given data item (or if the item with the highest confidence score does not exceed a threshold), then the item with the highest confidence score (or one item selected from a group of items with the highest confidence score) may be included for that match in electronic document 144, and the other potential matches may be recommended via user interface 150 as alternative items for inclusion.

User interface 150 is described in more detail above with respect to the examples included in FIGS. 3-6.

In some embodiments, electronic document 144 may be transmitted to one or more parties upon approval by a user. For example, if electronic document 144 is an electronic invoice, then the invoice may be sent to a customer when it is approved by a user via user interface 150.

It is noted that computing environment 100 is included as an example of computing components that may implement techniques described herein, and such techniques may be implemented using more or fewer components. Furthermore, examples described herein with respect to certain types of electronic documents, such as invoices, are not limiting, and embodiments of the present disclosure may also be performed to dynamically create other types of electronic documents based on information automatically extracted from a wide variety of types of electronic source documents and matched to a wide variety of types of entities.

Dynamic Extraction of Data from Source Electronic Documents

Figure 8:
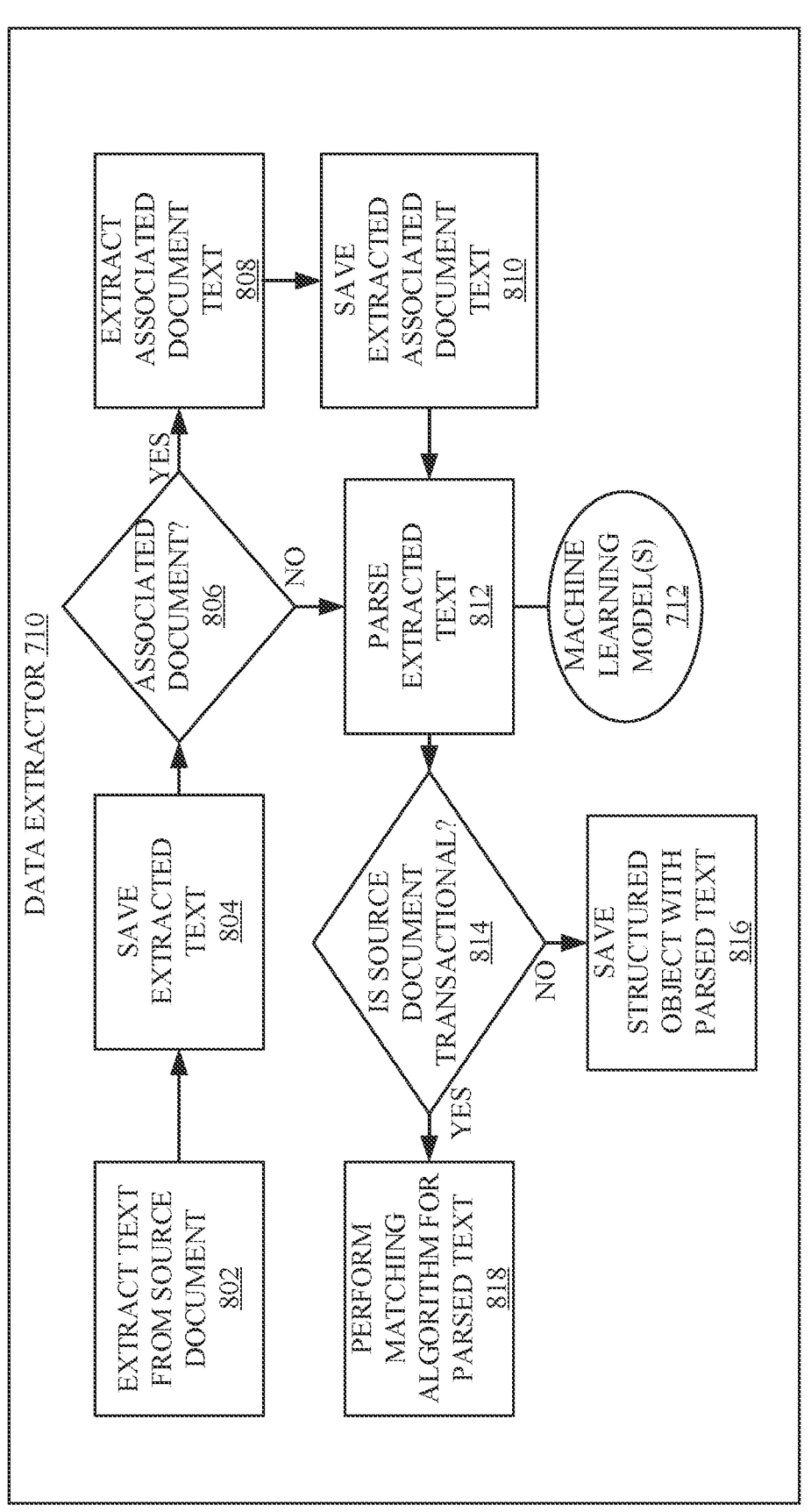
FIG. 8 depicts an example workflow for automatic extraction of data items from a source electronic document in connection with automated electronic document creation.

FIG. 8 is an illustration of an example workflow for automatically extracting data items from a source electronic document and/or from associated electronic documents. FIG. 8 includes data extractor 710 and machine learning model(s) 712 of FIG. 7, and generally represents operations that may be performed by such a data extractor and/or machine learning model.

At step 802, data extractor 710 extracts text from a source document such as source electronic document 102 of FIG. 7. Extracting text from the source document may involve identifying text present in an email or other type of document format that natively includes machine-readable text. In some cases, extracting text from the source document may involve performing optical character recognition (OCR) techniques or other text identification techniques in order to detect text present in the document, such as if the document is in the form of an image or other format that does not natively include machine-readable text.

At step 804, the text extracted at step 802 is saved (e.g., in memory or persistent storage). At decision 806, a determination is made of whether there are any associated document(s), such as attachments or other documents that are referenced by and/or otherwise associated with the source document. If one or more associated documents are identified, then operations proceed to step 808 where text is extracted from the one or more associated documents (e.g., in a similar manner to that described above with respect to step 802) and then to step 810 where text extracted from the one or more associated documents is saved (e.g., in memory or persistent storage). If there are no associated documents, then operations proceed to step 812, where the extracted text is parsed.

Step 812 involves the use of one or more machine learning models 712 to parse the text extracted from the source document (at step 802) and/or from one or more associated documents (at step 808, if such a step is performed). For example, the extracted text may be provided to a machine learning model 712 along with a prompt that instructs the machine learning model 712 to generate a structured object (e.g., a JSON object) containing one or more variables that are populated based on the input text. An example of such a prompt may include such natural language instructions as "I need you to analyze both the email content and the attached content (provided as transcribed text) of the following email" and "using this information, generate a structured output following the provided object structure," with a delineation of the structure of the object, such as including variables like intent, transaction type, transaction identifier, action, terms, product information such as variant name, product name, description, SKU, quantity, unit of measure, and price, customer or vendor information such as name, email, phone number, address, and company name, and/or the like. The prompt may further include natural language instructions such as "now, follow these steps: (1) identify the main intent of the email based on both email and attachment content" and "the potential intents could be: inquiry, order, transaction, shipping, marketing, feedback, support, billing, account update, others." The prompt may further instruct machine learning model 712 to take certain actions if certain conditions are met, such as apply certain rules if the intent is determined to be transactional. The rules may include indications such as to categorize an email as a sales invoice if it resembles a purchase order for a customer, to categorize an email as a purchase bill if it resembles an invoice from a vendor, or to categorize a request for a quote as an estimate. The prompt may also include other types of instructions, such as indicating that certain data items should only be extracted if they are mentioned explicitly in the email or attachment and/or indicating that an intended action in the email should be identified if possible, such as giving examples of potential actions like creating a transaction or updating a transaction. These are included as examples, and other instructions and rules may also or alternatively be included in the prompt. The prompt may be based on domain-specific knowledge and/or experimentation.

The machine learning model 712 may output extracted data items, such as in the form of a structured object, according to the instructions in the prompt. At decision 814, data extractor 710 determines whether the source document is transactional, such as based on an intent included in the data items output by the machine learning model 712. If the intent is transactional, then operations proceed to step 818, where a marching algorithm is performed for the parsed text, as described in more detail below with respect to FIG. 9. If the intent is not transactional, then the structured object with the parsed text is saved at step 816 (e.g., in memory or persistent storage), and matching may not be performed. For example, in some embodiments the matching algorithm is only performed for transactional source documents because those are the types of source documents that may be used to automatically create an electronic document such as an invoice.

Example Automatic Matching of Extracted Data Items to Entities in Data Store

Figure 9:
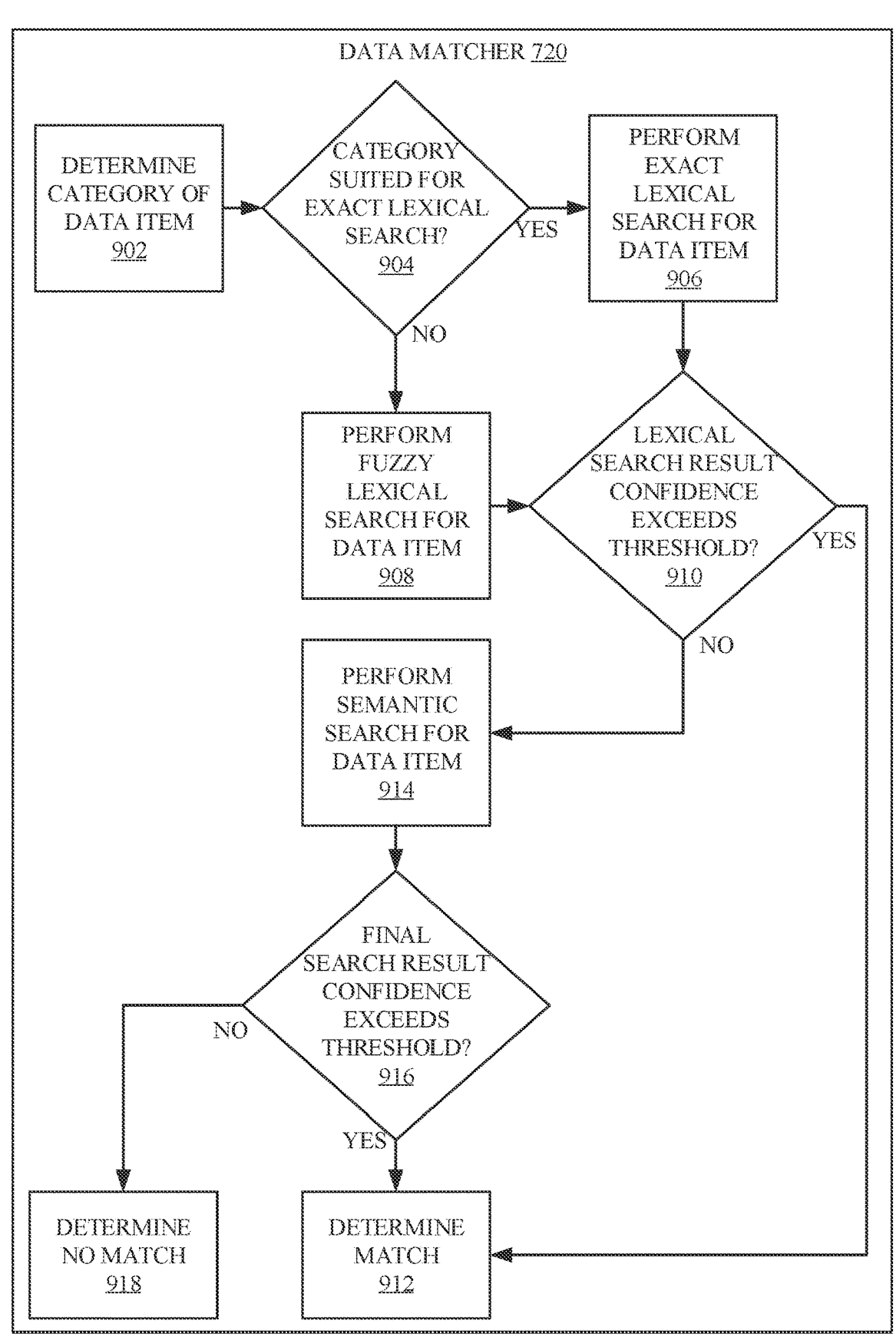
FIG. 9 depicts an example workflow for automatic matching of data items extracted from a source electronic document to elements in a data store in connection with automated electronic document creation.

FIG. 9 depicts an example workflow for automatic matching of data items extracted from a source electronic document to elements in a data store in connection with automated electronic document creation. FIG. 9 includes data matcher 720 of FIG. 7.

At step 902, data matcher 720 determines a category of a data item. The data item may, for example, have been extracted by data extractor 710 of FIGS. 7 and 8 from a source electronic document or an associated electronic document as described above, and may be included in a structured object such as a JSON object. Data matcher 720 may determine whether the category of the data item corresponds to one or more rules related to performing a matching algorithm, such as indicating the matching or search techniques that are to be used for certain categories of data items.

At decision 904, data matcher 720 determines whether the category of the data item determined at step 902 is suited for an exact lexical search, such as based on one or more rules. If the category is suited for an exact lexical search (e.g., if the category of the data item is a numerical identifier such as a SKU, which may be indicated in a rule as being suited for an exact lexical search), the operations may continue at step 906 where data matcher 720 performs an exact lexical search for the data item (e.g., in one or more data stores 730 of FIG. 7). An exact lexical search may be a search for an exact match of a series of characters. If the category is not suited for an exact lexical search, then operations may proceed at step 908, where a fuzzy lexical search is performed for the data item. A fuzzy lexical search may be a search for a string of characters that allows some amount of variation, such as determining a match between two strings if a similarity measure between the two strings exceeds or does not exceed a threshold (e.g., based on edit distance, based on a number of shared characters, and/or the like).

Whether an exact lexical search is performed at step 906 or a fuzzy lexical search is performed at step 908, operations proceed to decision 910, where data matcher 720 determines if a confidence score associated with one or more results of the lexical search exceeds a threshold. For example, the exact lexical search and/or the fuzzy lexical search may result in identifying a potential match having a respective confidence score indicating a likelihood that the match is correct (e.g., based on a degree or amount of similarity). If a confidence score associated with a result of the lexical search exceeds a threshold, then operations may proceed to step 912, where a match is determined (e.g., the potential match produced by the lexical search is determined to be a match if its confidence score exceeds a threshold). Otherwise, if the confidence score(s) associated with the one or more result of the lexical search do not exceed the threshold, then operations may continue at step 914, with performing a semantic search for the data item.

Performing a semantic search may involve generating an embedding of the data item and comparing the embedding of the data item to corresponding embeddings of entities in data store(s) 730 of FIG. 7, such as using cosine similarity or another similarity measure. The semantic search may also produce a confidence score associated with a result.

A final confidence score may be generated based on one or more confidence scores produced by an exact lexical search, a fuzzy lexical search, and/or a semantic search. It is noted that while certain embodiments may involve selecting which of these types of searches to perform and excluding certain types of searches based on the category of data item and/or the results of successive searches, other embodiments involve performing some or all of these types of searches (e.g., an exact lexical search, a fuzzy lexical search, and/or a semantic search) for some or all data items and aggregating results of the different types of searches that are performed in order to produce a final confidence score. For example, if a fuzzy lexical search for a product name from an email (e.g., "fettucine pasta") resulted in a potential match with an entity in the data store (e.g., "fettucine noodles") with a confidence score of 0.65 and a semantic search resulted in a match between these same two items with a confidence score of 0.98, then these two confidence scores may be aggregated in some manner to produce a final confidence score. In one embodiment, all confidence scores for a given match are averaged to produce a final confidence score for the given match. In another embodiment, different weights or boosts are applied to confidence scores produced by different types of searches, such as according to rules and/or the category of the data item. For instance, for numerical identifiers, exact lexical searches may be weighted more highly than fuzzy lexical searches and semantic searches, and fuzzy lexical searches may be weighted more highly than semantic searches (e.g., because numerical identifiers do not necessarily have semantic meaning, and are primarily lexical). In another example, for product names, semantic searches may be weighted more highly than any type of lexical search (e.g., because product names may be represented with different terminology, abbreviations, and spelling (e.g., due to variations and/or typographical errors), while the semantic meaning is likely to remain similar across these different representations). In one example, a final confidence score for a given match is determined by computing a weighted average of two or more confidence scores produced by an exact lexical search, a fuzzy lexical search, and/or a semantic search. If only one type of search is performed, then the final confidence score for a given match may be the confidence score produced by that one type of search. It is noted that confidence scores produced by one or more searches may be normalized so that they are in a common scale, such as between zero and one. In certain embodiments, a confidence score produced by a given search type that does not exceed a particular threshold (e.g., a threshold below which search results have historically not been useful) is excluded from the final confidence score computation for the given match in order to reduce noise.

At decision 916, data matcher 720 determines if the final search result confidence score for a given match exceeds a threshold. If the final search result confidence score for a given match exceeds the threshold, then operations continue at step 912, where a match is determined (e.g., the given match, which is at first only a potential match, is determined to be a match if its confidence score exceeds a threshold). If the final search result confidence score for a given match does not exceed the threshold, then operations continue at step 918, where no match is determined (e.g., the potential match is determined not to be a match).

It is noted that no particular type of search is necessarily performed in any given execution of the match algorithm. For example, some embodiments may involve determining no match and also determining not to perform a semantic search if a confidence score produced by one or more lexical searches is below a lower threshold. Alternative implementations may involve any combination of search types. None of the steps or decisions depicted in FIGS. 8 and 9 are intended to represent the only manner of performing a data extraction process or a match algorithm according to embodiments of the present disclosure, and other implementations and logical paths are possible.

Example Operations for Dynamic Interaction with an Automatically Created Electronic Document FIG. 10 depicts example operations 1000 for dynamic interaction with an automatically created electronic document. For example, operations 1000 may be relate to user interface 150 of FIGS. 3-7.

Operations 1000 begin at step 1002, with displaying, in a user interface associated with a computing application, a representation of an electronic document that was automatically created based on a source electronic document.

Operations 1000 continue at step 1004, with displaying, in the user interface, a representation of the source electronic document in a same screen as the representation of the electronic document.

Operations 1000 continue at step 1006, with detecting, via the user interface, a user action with respect to an item in the electronic document.

Operations 1000 continue at step 1008, with displaying, in the user interface, based on the user action, in the same screen as the representation of the electronic document and the representation of the source electronic document, a visual indication that the item was automatically determined based on a particular portion of the source electronic document.

In some embodiments, displaying the representation of the electronic document and the representation of the source electronic document comprises displaying the representation of the electronic document in a first panel of the user interface and displaying the representation of the source electronic document in a second panel of the user interface. The second panel may be adjacent to the first panel within the user interface.

In certain embodiments, displaying the visual indication that the item was automatically determined based on the particular portion of the source electronic document comprises changing formatting of the particular portion of the source electronic document within the representation of the source electronic document.

In some embodiments, displaying the visual indication that the item was automatically determined based on the particular portion of the source electronic document comprises displaying, adjacent to the item in the representation of the electronic document, a pop-up window that includes the particular portion of the source electronic document.

Certain embodiments further comprise displaying, in the user interface, a given visual representation of a confidence value associated with an automated match between the item in the electronic document and the particular portion of the source electronic document.

In some embodiments, displaying the given visual representation of the confidence value associated with the automated match between the item in the electronic document and the particular portion of the source electronic document comprises displaying a color associated with the confidence value.

Certain embodiments further comprise displaying, in the user interface, an alternative item that was automatically identified as an alternative for the particular portion of the source electronic document.

Some embodiments further comprise displaying, in the user interface, a user interface control that, when selected, causes the item to be replaced in the electronic document with the alternative item.

In certain embodiments, detecting the user action comprises determining that the user has moved a cursor over the item in the electronic document or selected the item in the electronic document.

Some embodiments further comprise displaying, in the user interface, a representation of an additional source electronic document associated with the source electronic document. For example, the electronic document may have been automatically created based further on the additional source electronic document.

Certain embodiments further comprise providing, as inputs to a machine learning model, contents of the source electronic document and a prompt that instructs the machine learning model to extract particular data items from the source electronic document based on contextual information included in the prompt. Some embodiments further comprise receiving the particular data items from the machine learning model in response to the inputs and determining an entity from a data store that matches a data item of the particular data items based on performing a matching algorithm. Certain embodiments further comprise automatically generating the electronic document by populating an electronic document template based on the entity from the data store that matches the data item.

Notably, operations 1000 is just one example with a selection of example steps, but additional methods with more, fewer, and/or different steps are possible based on the disclosure herein.

Example Computing System

Figure 11:
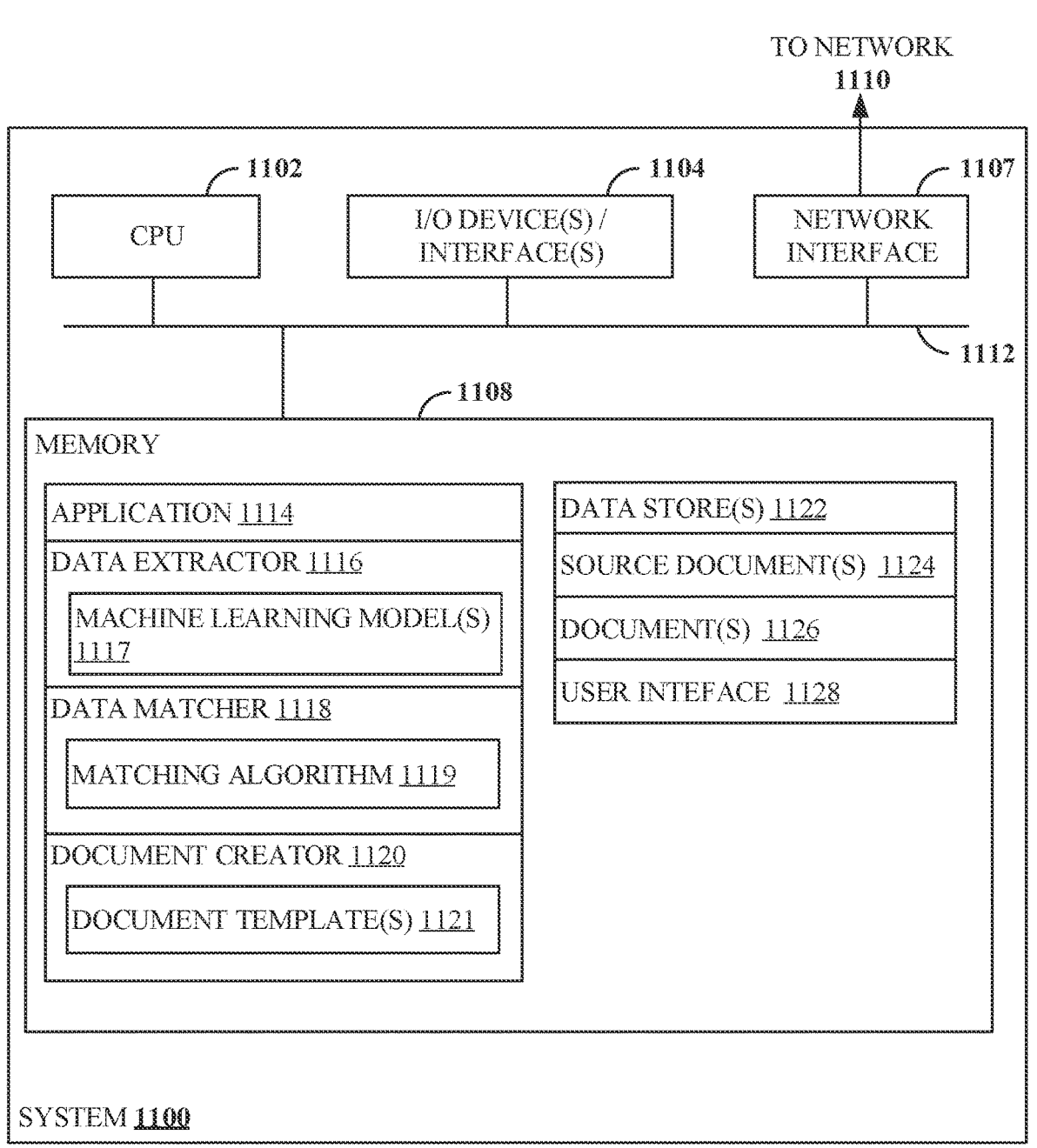
FIG. 11 depicts an example processing system for automated electronic document creation and dynamic interaction with an automatically created electronic document.

FIG. 11 illustrates an example system 1100 with which embodiments of the present disclosure may be implemented. For example, system 1100 may be configured to perform operations 1000 of FIG. 10.

System 1100 includes a central processing unit (CPU) 1102, one or more I/O device interfaces 1104 that may allow for the connection of various I/O devices 1104 (e.g., keyboards, displays, mouse devices, pen input, etc.) to the system 1100, network interface 1106, a memory 1108, and an interconnect 1112. It is contemplated that one or more components of system 1100 may be located remotely and accessed via a network 1110. It is further contemplated that one or more components of system 1100 may comprise physical components or virtualized components.

CPU 1102 may retrieve and execute programming instructions stored in the memory 1108. Similarly, the CPU 1102 may retrieve and store application data residing in the memory 1108. The interconnect 1112 transmits programming instructions and application data, among the CPU 1102, I/O device interface 1104, network interface 1106, and memory 1108. CPU 1102 is included to be representative of a single CPU, multiple CPUs, a single CPU having multiple processing cores, and other arrangements.

Additionally, the memory 1108 is included to be representative of a random access memory or the like. In some embodiments, memory 1108 may comprise a disk drive, solid state drive, or a collection of storage devices distributed across multiple storage systems. Although shown as a single unit, the memory 1108 may be a combination of fixed and/or removable storage devices, such as fixed disc drives, removable memory cards or optical storage, network attached storage (NAS), or a storage area-network (SAN).

As shown, memory 1108 includes an application 1114, which may be a software application that performs operations related to the electronic document creation techniques described herein. Memory 1108 further includes data extractor 1116, machine learning model(s) 1117, data matcher 1118, matching algorithm 1119, document creator 1120, document template(s) 1121, and data store(s) 1122, which may be representative of data extractor 710, machine learning model(s) 712, data matcher 720, matching algorithm 722, document creator 740, document template(s) 742, and data store(s) 730 of FIG. 7.

Memory 1108 further comprises source document(s) 1124 and document(s) 1126, which may include electronic source document 102 and electronic document 144 of FIGS. 1, 2, and 7. Memory 1108 further comprises user interface 1128, which may represent user interface 150 of FIG. 7 and/or any one or more of FIGS. 3-6. Generally, system 1100 is a non-limiting example, and techniques described herein may be performed by more or fewer components located on one or more computing devices.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations.

Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 712 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for dynamic interaction with an automatically created electronic document, comprising:

displaying, in a user interface associated with a computing application, a representation of an electronic document that was automatically created based on a source electronic document through a machine learning based document creation process comprising automatically extracting a data item from the source electronic document using a machine learning model and automatically creating the electronic document based on matching the automatically extracted data item to a stored data item through an automated semantic matching technique;

displaying, in the user interface, based on the electronic document being automatically created based on the source electronic document through the machine learning based document creation process, a representation of the source electronic document in a same screen as the representation of the electronic document;

detecting, via the user interface, a user action with respect to an item in the electronic document that corresponds to the stored data item; and displaying, in the user interface, based on the user action and based on the machine learning based document creation process, in the same screen as the representation of the electronic document and the representation of the source electronic document, a visual indication that the item was automatically determined based on a particular portion of the source electronic document comprising the automatically extracted data item, wherein the visual indication comprises one or more of:

a change, in response to the user action, to a color, size, font, formatting, or other attribute of the particular portion of the source electronic document within the user interface; or a pop-up window, displayed in response to the user action, adjacent to the item in the representation of the electronic document, that includes the particular portion of the source electronic document.

2. The method of claim 1, wherein displaying the representation of the electronic document and the representation of the source electronic document comprises displaying the representation of the electronic document in a first panel of the user interface and displaying the representation of the source electronic document in a second panel of the user interface, wherein the second panel is adjacent to the first panel within the user interface.

3. The method of claim 1, wherein displaying the visual indication that the item was automatically determined based on the particular portion of the source electronic document comprises changing formatting of the particular portion of the source electronic document within the representation of the source electronic document.

4. The method of claim 1, further comprising displaying, in the user interface, a given visual representation of a confidence value associated with an automated match between the item in the electronic document and the particular portion of the source electronic document.

5. The method of claim 4, wherein displaying the given visual representation of the confidence value associated with the automated match between the item in the electronic document and the particular portion of the source electronic document comprises displaying a color associated with the confidence value.

6. The method of claim 1, further comprising displaying, in the user interface, an alternative item that was automatically identified as an alternative for the particular portion of the source electronic document.

7. The method of claim 6, further comprising displaying, in the user interface, a user interface control that, when selected, causes the item to be replaced in the electronic document with the alternative item.

8. The method of claim 1, wherein detecting the user action comprises determining that a user has moved a cursor over the item in the electronic document or selected the item in the electronic document.

9. The method of claim 1, further comprising displaying, in the user interface, a representation of an additional source electronic document associated with the source electronic document, wherein the electronic document was automatically created based further on the additional source electronic document.

10. A system for dynamic interaction with an automatically created electronic document, comprising:

one or more processors; and a memory storing instructions that, when executed by the one or more processors, cause the system to:

display, in a user interface associated with a computing application, a representation of an electronic document that was automatically created based on a source electronic document through a machine learning based document creation process comprising automatically extracting a data item from the source electronic document using a machine learning model and automatically creating the electronic document based on matching the automatically extracted data item to a stored data item through an automated semantic matching technique;

display, in the user interface, based on the electronic document being automatically created based on the source electronic document through the machine learning based document creation process, a representation of the source electronic document in a same screen as the representation of the electronic document;

detect, via the user interface, a user action with respect to an item in the electronic document that corresponds to the stored data item; and display, in the user interface, based on the user action and based on the machine learning based document creation process, in the same screen as the representation of the electronic document and the representation of the source electronic document, a visual indication that the item was automatically determined based on a particular portion of the source electronic document comprising the automatically extracted data item, wherein the visual indication comprises one or more of:

a change, in response to the user action, to a color, size, font, formatting, or other attribute of the particular portion of the source electronic document within the user interface; or a pop-up window, displayed in response to the user action, adjacent to the item in the representation of the electronic document, that includes the particular portion of the source electronic document.

11. The system of claim 10, wherein displaying the representation of the electronic document and the representation of the source electronic document comprises displaying the representation of the electronic document in a first panel of the user interface and displaying the representation of the source electronic document in a second panel of the user interface, wherein the second panel is adjacent to the first panel within the user interface.

12. The system of claim 10, wherein displaying the visual indication that the item was automatically determined based on the particular portion of the source electronic document comprises changing formatting of the particular portion of the source electronic document within the representation of the source electronic document.

13. The system of claim 10, wherein the instructions, when executed by the one or more processors, further cause the system to display, in the user interface, a given visual representation of a confidence value associated with an automated match between the item in the electronic document and the particular portion of the source electronic document.

14. The system of claim 13, wherein displaying the given visual representation of the confidence value associated with the automated match between the item in the electronic document and the particular portion of the source electronic document comprises displaying a color associated with the confidence value.

15. The system of claim 10, wherein the instructions, when executed by the one or more processors, further cause the system to display, in the user interface, an alternative item that was automatically identified as an alternative for the particular portion of the source electronic document.

16. The system of claim 15, wherein the instructions, when executed by the one or more processors, further cause the system to display, in the user interface, a user interface control that, when selected, causes the item to be replaced in the electronic document with the alternative item.

17. A non-transitory computer readable medium comprising instructions that, when executed by one or more processors of a computing system, cause the computing system to:

display, in a user interface associated with a computing application, a representation of an electronic document that was automatically created based on a source electronic document through a machine learning based document creation process comprising automatically extracting a data item from the source electronic document using a machine learning model and automatically creating the electronic document based on matching the automatically extracted data item to a stored data item through an automated semantic matching technique;

display, in the user interface, based on the electronic document being automatically created based on the source electronic document through the machine learning based document creation process, a representation of the source electronic document in a same screen as the representation of the electronic document;

detect, via the user interface, a user action with respect to an item in the electronic document that corresponds to the stored data item; and display, in the user interface, based on the user action and based on the machine learning based document creation process, in the same screen as the representation of the electronic document and the representation of the source electronic document, a visual indication that the item was automatically determined based on a particular portion of the source electronic document comprising the automatically extracted data item, wherein the visual indication comprises one or more of:

a change, in response to the user action, to a color, size, font, formatting, or other attribute of the particular portion of the source electronic document within the user interface; or a pop-up window, displayed in response to the user action, adjacent to the item in the representation of the electronic document, that includes the particular portion of the source electronic document.

* * * * *